(12) United States Patent
Inoue et al.

(10) Patent No.: US 8,125,887 B2
(45) Date of Patent: Feb. 28, 2012

(54) MOBILE COMMUNICATION SYSTEM, ITS SCRAMBLE CODE ASSIGNING METHOD, MOBILE STATION, AND BASE STATION

(75) Inventors: Takamichi Inoue, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 12/281,280

(22) PCT Filed: Mar. 1, 2007

(86) PCT No.: PCT/JP2007/053883
§ 371 (c)(1),
(2), (4) Date: Aug. 29, 2008

(87) PCT Pub. No.: WO2007/100032
PCT Pub. Date: Sep. 7, 2007

(65) Prior Publication Data
US 2009/0011765 A1 Jan. 8, 2009

(30) Foreign Application Priority Data

Mar. 1, 2006 (JP) ................................. 2006-054869

(51) Int. Cl.
*H04J 11/00* (2006.01)
*H04W 4/00* (2009.01)
*H04B 7/216* (2006.01)

(52) U.S. Cl. ......... 370/208; 370/332; 370/335; 455/434

(58) Field of Classification Search .................. 370/335, 370/328, 331, 350, 332, 345; 375/130, 145, 375/146, 150, 265, 267, 343, 344; 455/411, 455/432.1, 434, 435.1, 452.2, 453, 456.1, 455/463–464
See application file for complete search history.

(56) References Cited

U.S. PATENT DOCUMENTS 6,546,258 B1 * 4/2003 Nohara et al. ............. 455/456.1
(Continued)

FOREIGN PATENT DOCUMENTS

JP 7-079477 A 3/1995
(Continued)

OTHER PUBLICATIONS

3GPP, R3-051105 NTT DoCoMo, "Location of RRC&RRM functions for EUTRAN", Oct. 2005.
(Continued)

*Primary Examiner* — Tri H Phan
(74) *Attorney, Agent, or Firm* — Sughrue Mion, PLLC

(57) ABSTRACT

An object of the present invention is to reduce the amount of calculation performed in a mobile station and amount of information exchanged between a base station and mobile station in a mobile communication system where the base station autonomously assigns a scramble code. In the mobile communication system, the base station starts communication by using a predetermined initialization scramble code used only at its activation time. The mobile station positioned in a cell determines whether the scramble code identified upon cell search time is the initialization scramble code. Only when the scramble code is the initialization scramble code, the mobile station determines a candidate scramble code, determines whether the candidate scramble code is usable in communication, and notifies the base station of the control information including the determination result. Based on the control information, the base station determines a service scramble code to be used, from the candidate scramble codes, and applies the service scramble code to start communication.

25 Claims, 13 Drawing Sheets

U.S. PATENT DOCUMENTS

| | | | |
|---|---|---|---|
| 6,744,747 B2 * | 6/2004 | Shiu et al. | 370/331 |
| 6,961,565 B2 * | 11/2005 | Tanno et al. | 455/434 |
| 7,328,019 B2 * | 2/2008 | Nishikawa et al. | 455/436 |
| 7,603,124 B2 * | 10/2009 | Claussen et al. | 455/437 |
| 2002/0003782 A1 * | 1/2002 | Pan et al. | 370/280 |

FOREIGN PATENT DOCUMENTS

| | | |
|---|---|---|
| JP | 10-191421 A | 7/1998 |
| JP | 2000032560 A | 1/2000 |
| JP | 2000-102064 A | 4/2000 |
| JP | 2003-219478 A | 7/2003 |
| JP | 2005-142967 A | 6/2005 |
| JP | 2005-175611 A | 6/2005 |

OTHER PUBLICATIONS

Japanese Office Action issued Dec. 1, 2011 by the Japanese Patent Office in corresponding Japanese Application No. 2008-502837.

* cited by examiner

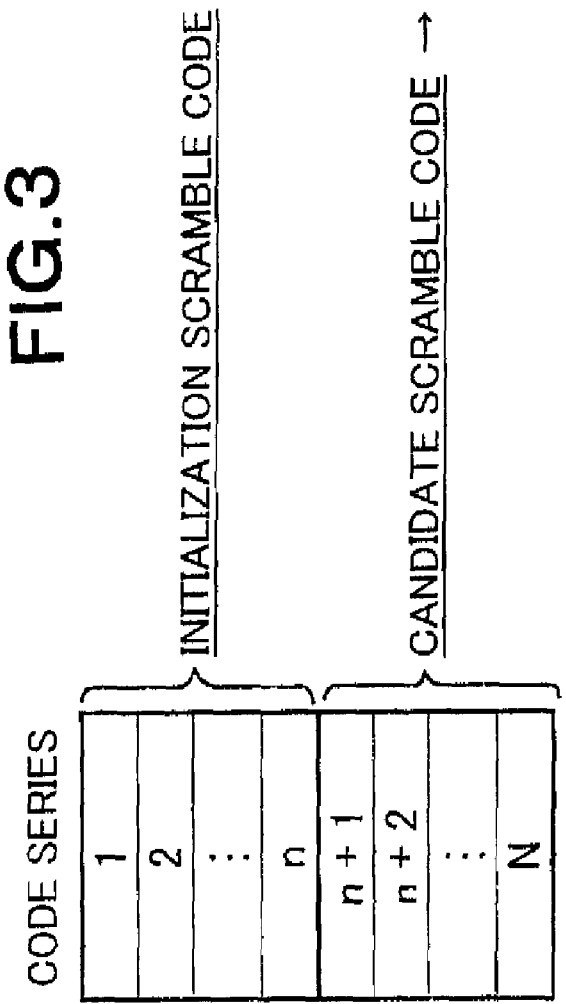

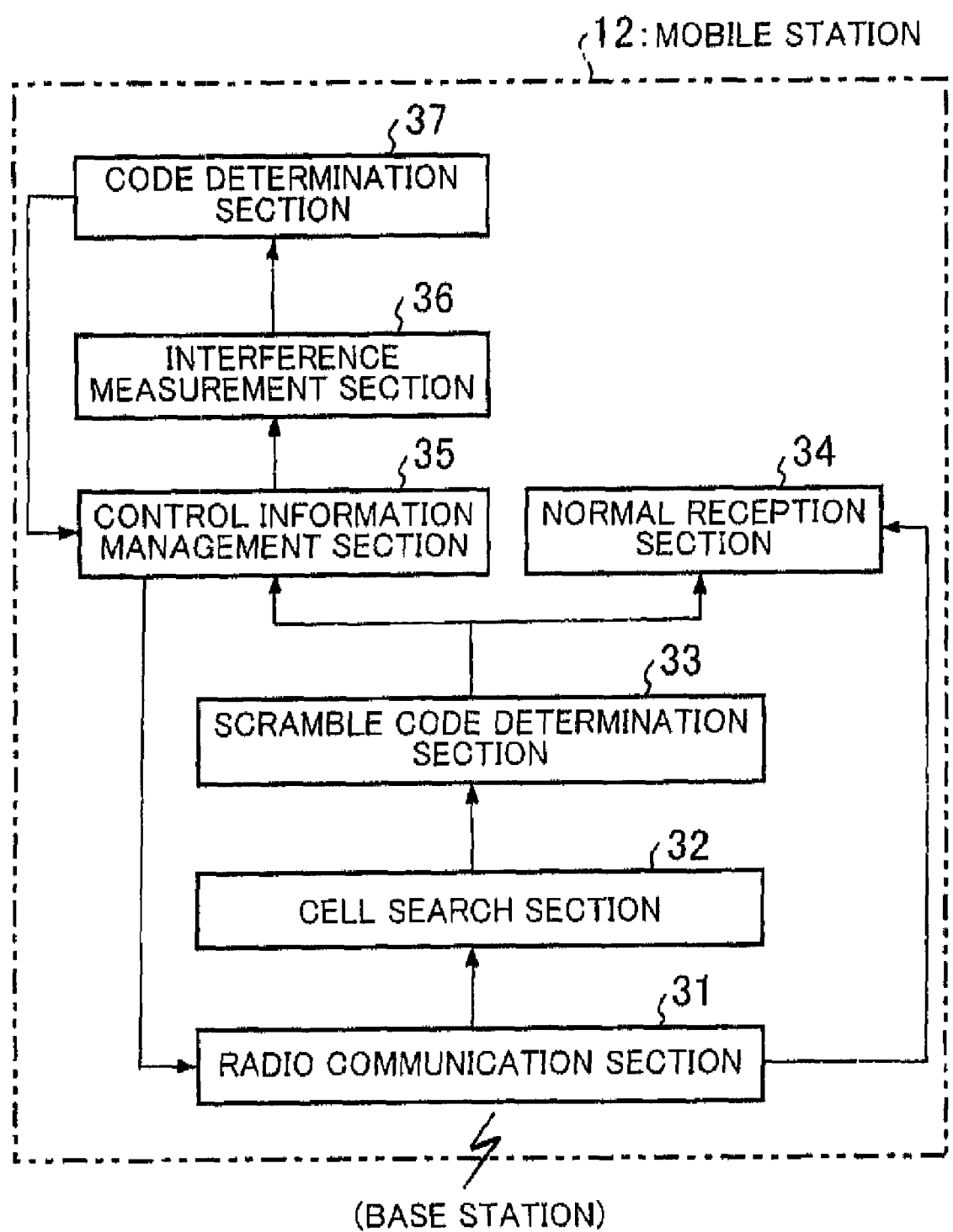

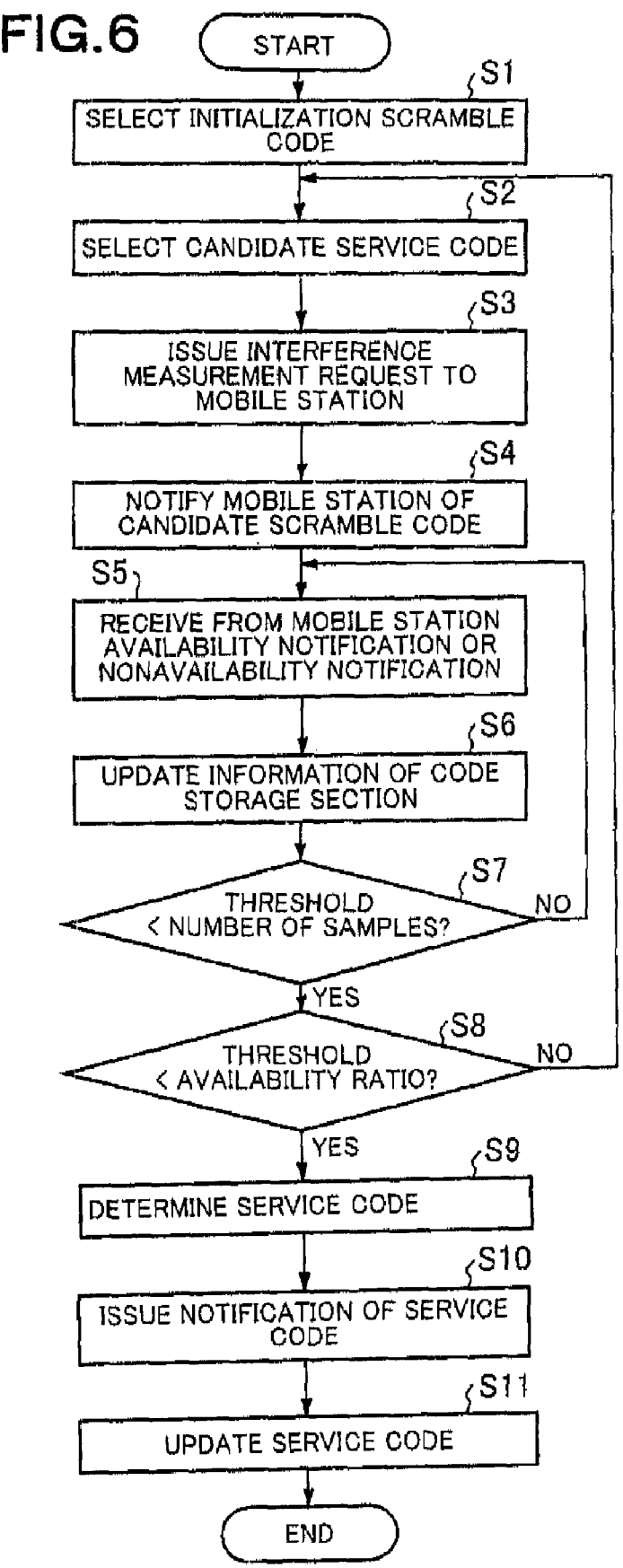

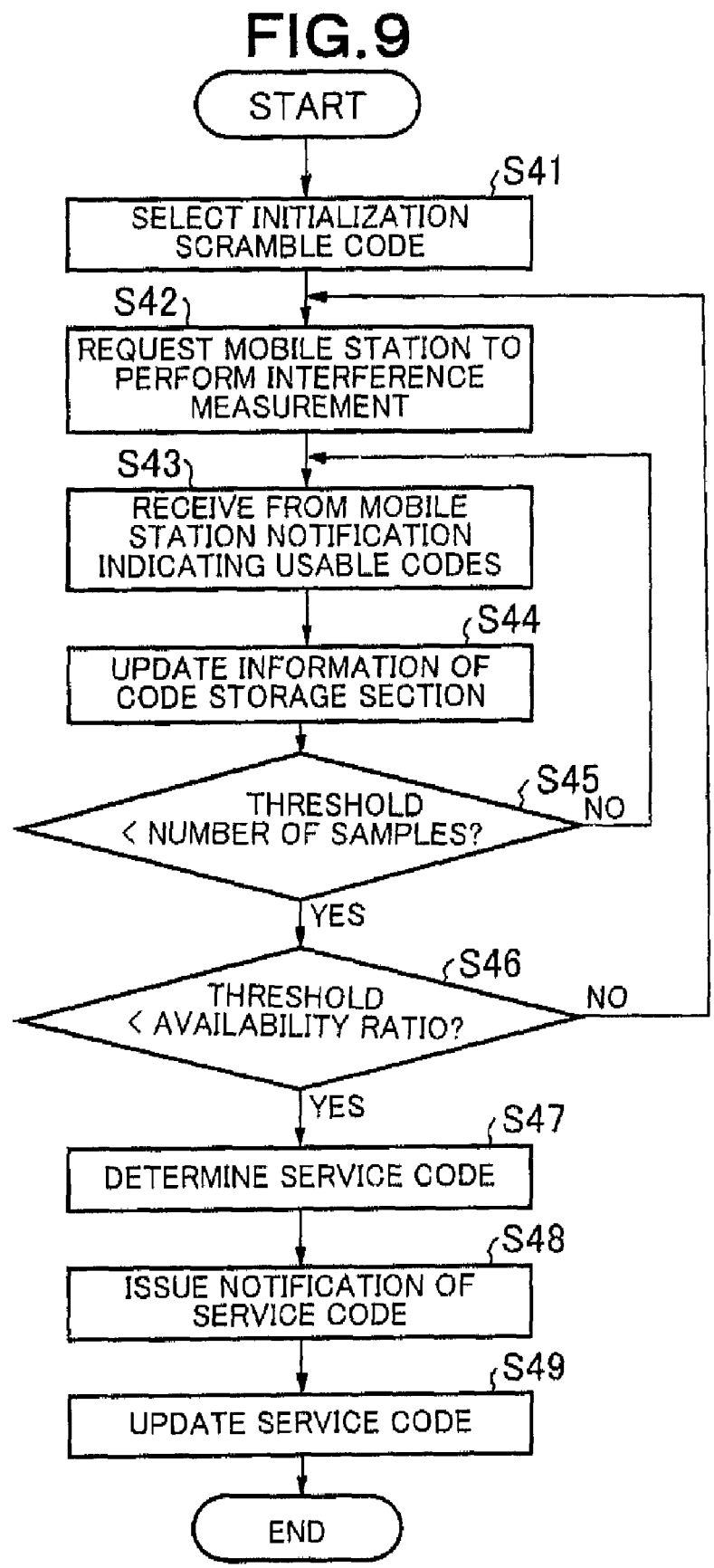

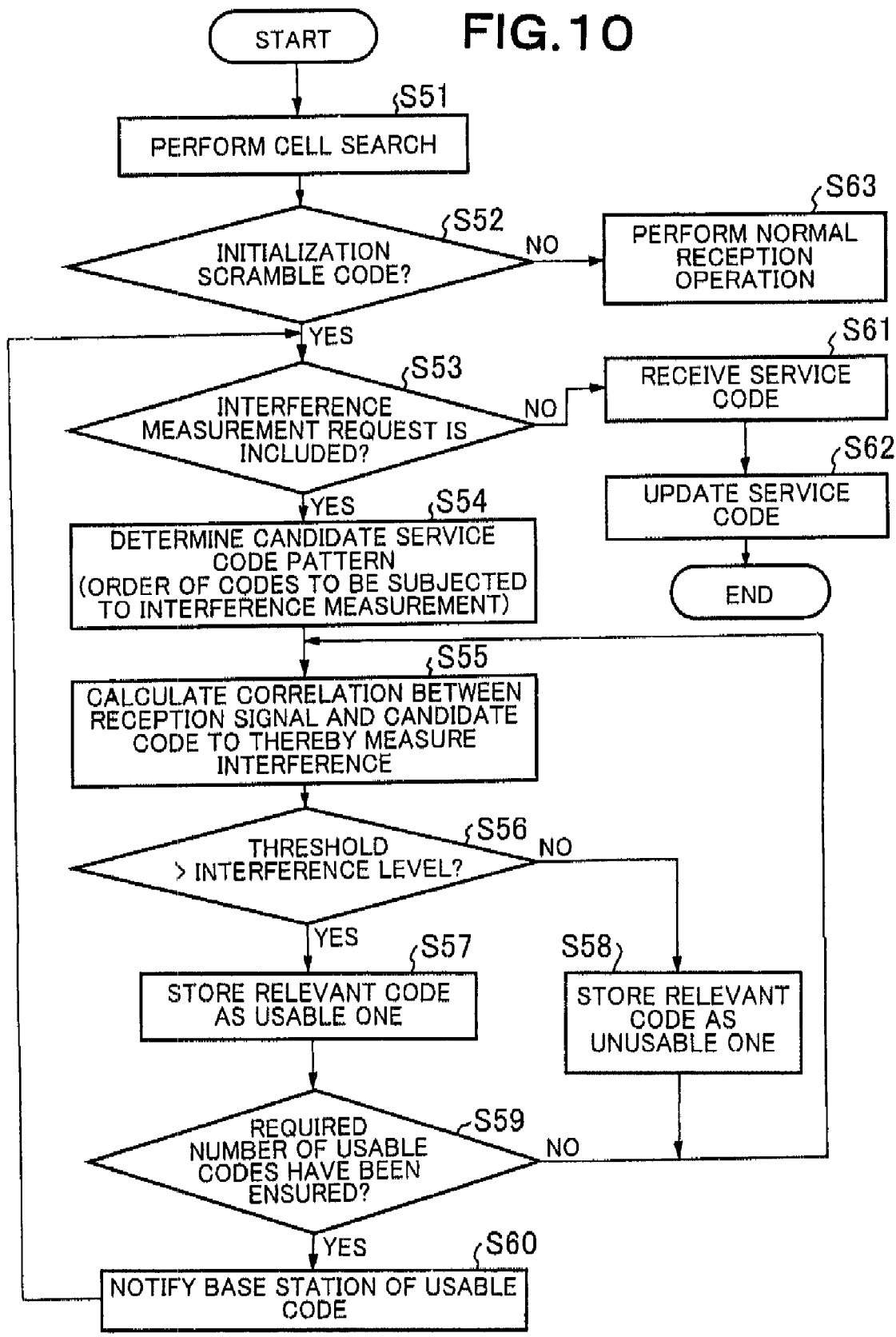

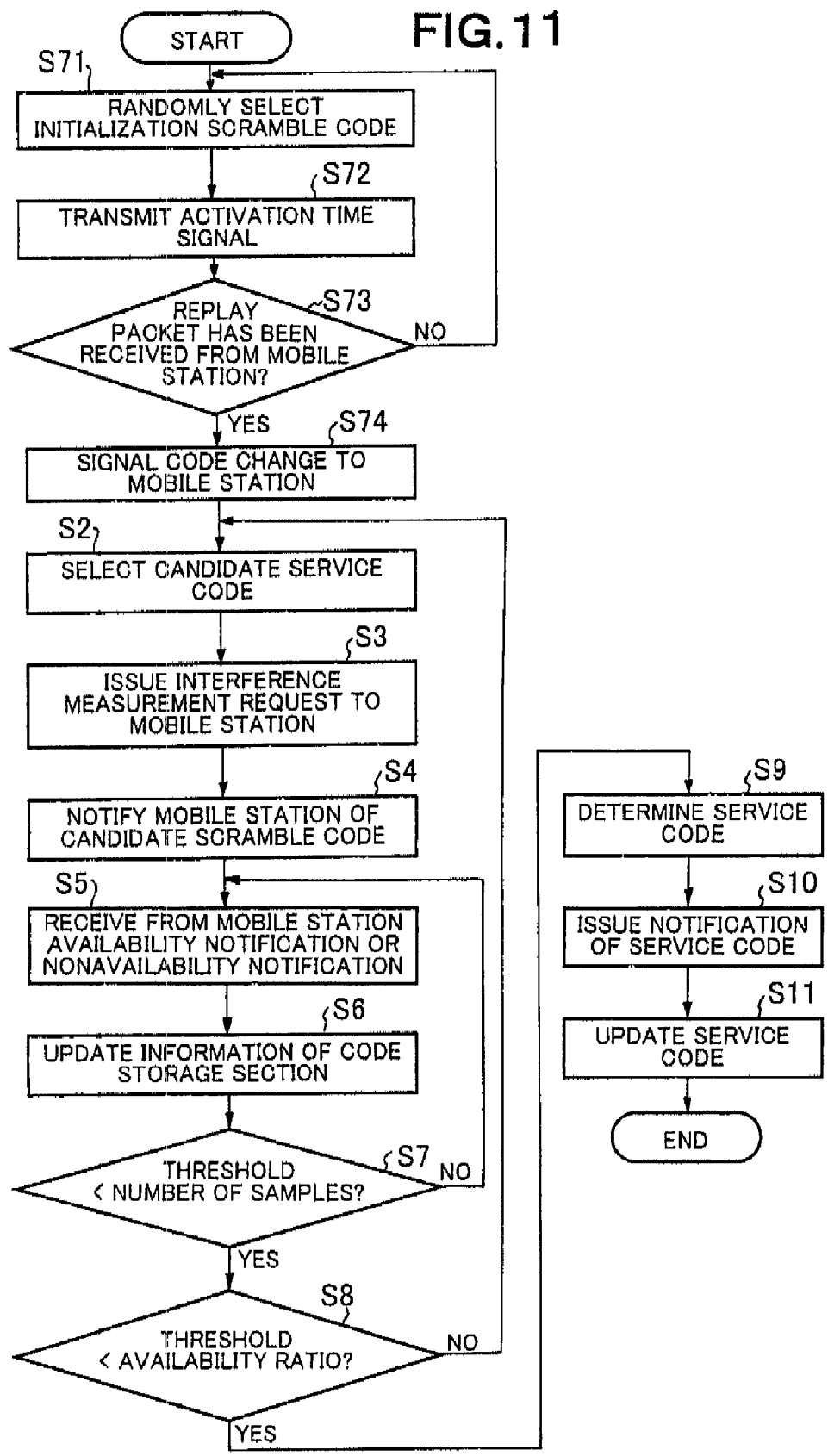

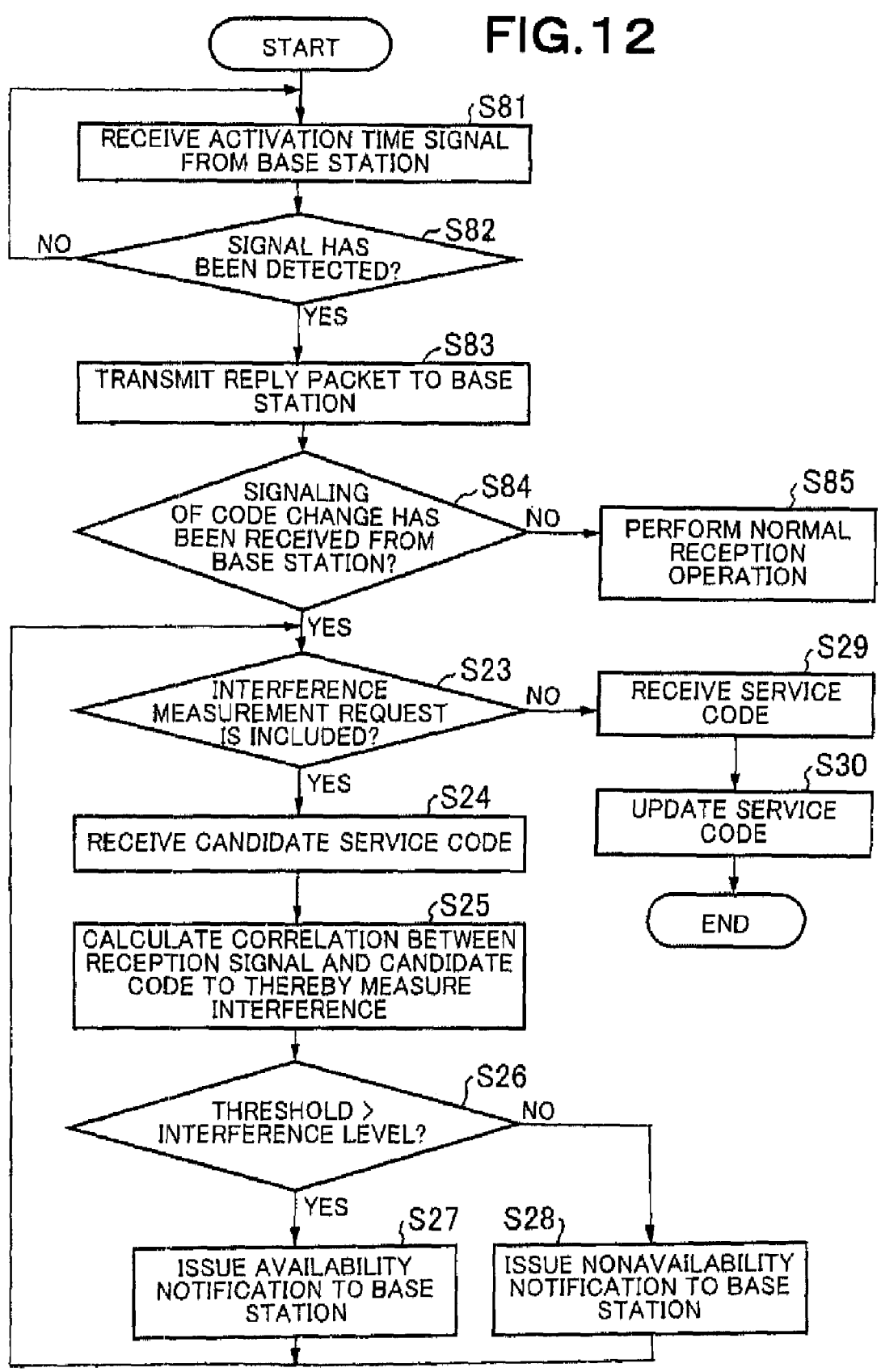

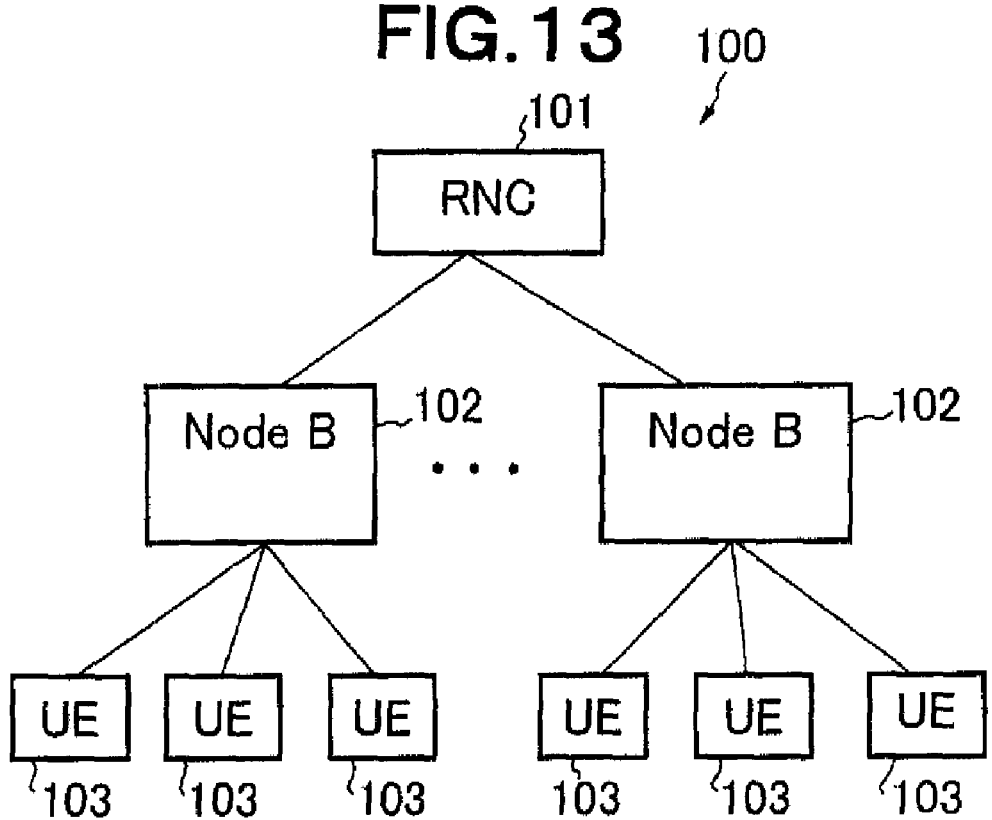
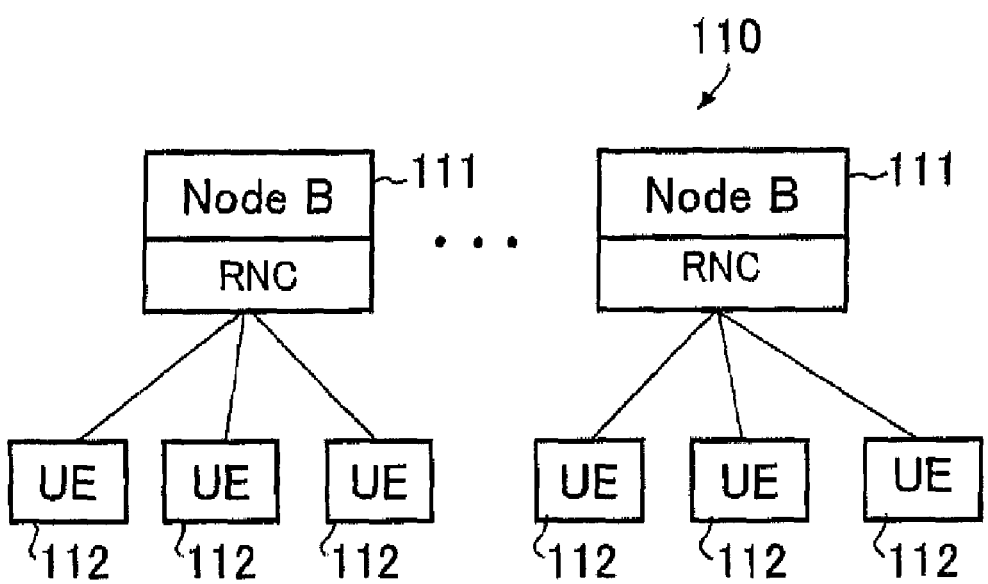

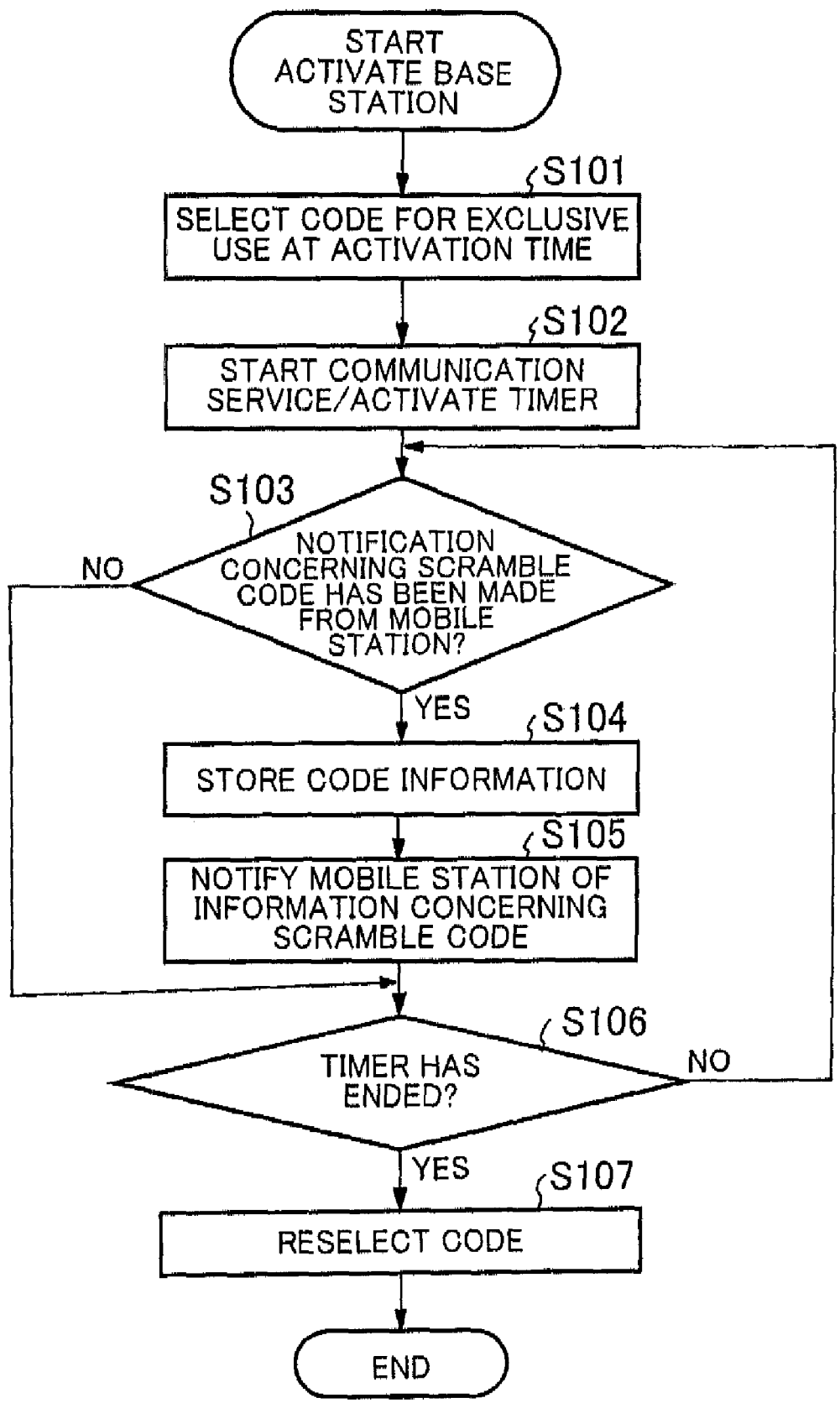

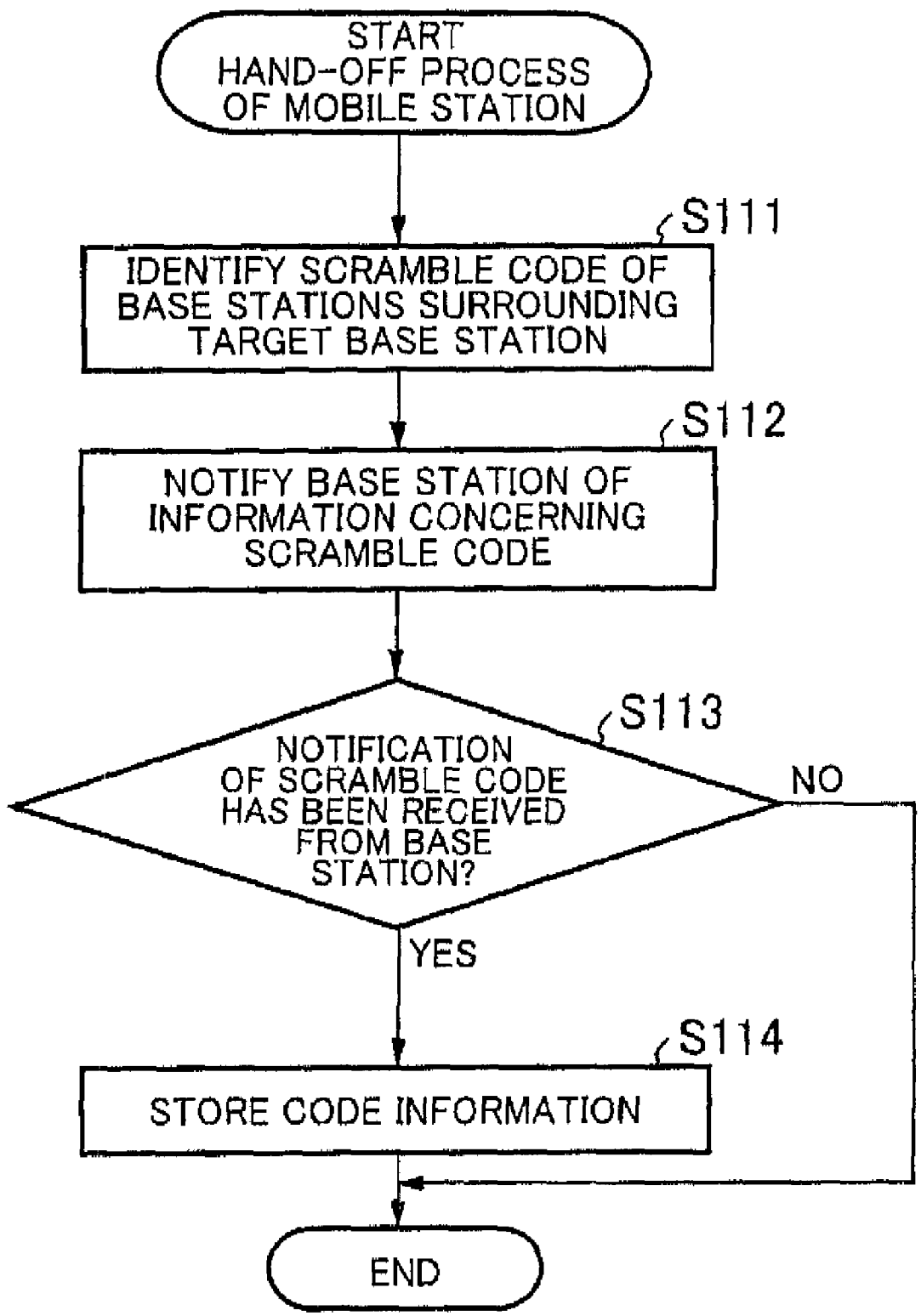

MOBILE COMMUNICATION SYSTEM, ITS SCRAMBLE CODE ASSIGNING METHOD, MOBILE STATION, AND BASE STATION

TECHNICAL FIELD

The present invention relates to a mobile communication system, its scramble code assigning method, a mobile station, a base station, an operation method and program of the mobile station, and an operation method and program of the base station and, more particularly, to a method in which the base station autonomously sets a scramble code in a scramble code assigning method employed in a mobile radio communication cellular system.

BACKGROUND ART

In a present mobile communication cellular system, radio communication is performed between a mobile station and a base station by using a base station specific scramble code. Assignment of the scramble code is uniquely managed by a central node that controls a plurality of base stations. A system configuration in this case is shown in FIG. 13.

A mobile communication cellular system 100 shown in FIG. 13 includes, on a not-shown network, a central node 101 having an RNC (Radio Network Controller) function. A plurality of base stations (Node B) 102, . . . , 102 are connected under the central node 101. The base stations 102, . . . , 102 perform radio communication with a plurality of mobile stations (UE: User Equipment) 103, . . . , 103, respectively, in their respective service areas (cells). A base station specific scramble code used between the base station 102 and the mobile station 103 at the communication time is managed by the RNC of the central node 101.

Non-Patent Document 1 proposes a network configuration of the mobile communication cellular system where the system can work without such a central node. A system configuration in this case is shown in FIG. 14.

A mobile communication cellular system 110 shown in FIG. 14 includes, on a not-shown network, a plurality of base stations (Node B) 111, . . . , 111 each having an RNC function. The base stations 111, . . . , 111 perform radio communication with a plurality of mobile stations (UE) 112, . . . , 112, respectively, in their respective service areas (cells). Development of such a system capable of working without the abovementioned central node on a network is now demanded.

In view of this, Patent Document 1 proposes a method in which a base station autonomously makes assignment of a scramble code without depending on the central node. The method in which the base station of Patent Document 1 autonomously makes assignment of a scramble code will be described with reference to FIGS. 15 and 16.

FIG. 15 is a flowchart showing the operation of a conventional base station.

When being activated, the base station selects a code for exclusive use at activation time (step S101). The base station then starts a communication service and, at the same time, activates a timer (step S102). Subsequently, the base station determines whether a notification concerning a scramble code has been received from a mobile station (step S103). When determining that the notification concerning a code has not received from the mobile station (NO in step S103), the base station proceeds to step S106. On the other hand, when determining that the notification concerning a code has received from the mobile station (YES in step S103), the base station stores the notification information (step S104) and notifies the mobile station of information concerning scramble codes of its surrounding base stations that the base station has stored (step S105).

Then, the base station determines whether the timer activated in step S102 has ended (step S106). When determining that the timer has not ended (NO in step S106), the base station returns to step S103. On the other hand, when determining that the timer has ended (YES in step S106), the base station uses information concerning the scramble codes of its surrounding base stations that the base station has stored to reselect a scramble code from service scramble codes (step S107).

FIG. 16 is a flowchart showing the operation of a conventional mobile station.

The mobile station identifies scramble codes of the base stations surrounding the target base station when performing a hand-off process and stores them in a scramble code management table of the mobile station (step S111). Then, the mobile station notifies the target base station of information concerning the base stations surrounding the target base station which is stored in the scramble code management table (step S112). Subsequently, the mobile station determines whether a notification of information concerning the base stations surrounding the target base station which is stored in a scramble code management table of the target base station has been received (step S113). When determining that the notification has not been received from the target base station (NO in step S113), the mobile station ends its operation. On the other hand, when determining that the notification has been received from the target base station (YES in step S113), the mobile station updates the scramble code management table (step S114) and ends its operation.

Patent Document 1: JP-A 2005-142967
Non-Patent Document 1: 3GPP, R3-051105 NTT DoCoMo, "Location of RRC&RRM functions for EUTRAN", October 2005

DISCLOSURE OF THE INVENTION

Problems to be Solved by the Invention

In the abovementioned conventional method, the mobile station needs to correctly identify the scramble codes of the base stations surrounding the target base station. However, it is difficult for the mobile station to correctly identify the scramble codes of the base stations surrounding the target base station especially in an environment suffering from large inter-cell interference. Further, since the mobile station identifies all the scramble codes of the base stations surrounding the target base station, the calculation amount and the time needed for the identification are increased, causing an increase in power consumption. Furthermore, unique information of the scramble codes of the base stations surrounding the target base station needs to be frequently exchanged, the frequency and amount of notification information exchanged between the mobile station and the target base station increase.

An object of the present invention is to provide a method in which a base station autonomously selects a scramble code without identification of scramble codes of base stations surrounding a target base station while suppressing the calculation amount and power consumption of a mobile station and reducing notification information between the base station and the mobile station to the minimum.

Means for Solving the Problems

In order to achieve the above object, according to a first aspect of the present invention, there is provided a scramble code assigning method of a mobile communication system that performs communication between a base station and a mobile station using a scramble code, characterized by comprising: a first communication step in which the base station determines an initialization scramble code from among a plurality of previously determined scramble codes and uses the determined initialization scramble code to perform communication; a notification step in which the mobile station determines, upon reception of a signal transmitted by the first communication step, whether a candidate scramble code selected from among code series other than the initialization scramble code is usable or not in communication, and notifies the base station of control information including the determination result; and a second communication step in which the base station determines a service scramble code from the candidate scramble codes based on the notified control information and uses the determined service scramble code to perform communication.

The present invention may further comprise a step in which the base station selects the candidate scramble code from the plurality of scramble codes and notifies the mobile station of the selected candidate scramble code. The present invention may further comprise a step in which the mobile station selects the candidate scramble code from the plurality of scramble codes.

In the present invention, the notification step may include a step in which the mobile station measures a correlation value between the signal transmitted from the base station and candidate scramble code and determines, based on the measured correlation value, whether the candidate scramble code is usable or not in communication. The notification step may include a step in which the mobile station determines whether the candidate scramble code is usable or not in communication when receiving a predetermined control signal from the mobile station. The notification step may include a step in which the mobile station determines whether the candidate scramble code is usable or not in communication when identifying the initialization scramble code.

In the present invention, the first communication step may include a step in which the base station selects the initialization scramble code from among one or more previously assigned initialization scramble codes in the plurality of previously set scramble codes. The first communication step may include a step in which the base station selects the initialization scramble code from among the plurality of previously set scramble codes.

In the present invention, the notification step may include a step in which the mobile station notifies the base station of at least one of control information indicating that the candidate scramble code is determined to be usable in communication and control information indicating that the candidate scramble code is determined to be unusable. The second communication step may include a step in which the base station determines the candidate scramble code as the service scramble code based on the total number of notifications of the control information transmitted from the mobile station and total number of notifications of control information indicating that the candidate scramble code is determined to be usable in communication or total number of notifications of control information indicating that the candidate scramble code is determined to be unusable in communication.

Further, according to a second aspect of the present invention, there is provided a mobile communication system that performs communication between a base station and a mobile station using a scramble code, characterized in that the base station includes: a first communication means for determining an initialization scramble code from among a plurality of previously determined scramble codes and using the determined initialization scramble code to perform communication; and a second communication means for determining a service scramble code from the candidate scramble codes based the control information notified from the mobile station and using the determined service scramble code to perform communication, and the mobile station includes: a determination means for determining whether a candidate scramble code selected from among code series other than the initialization scramble code is usable or not in communication upon reception of a signal transmitted by the first communication means of the base station; and a notification means for notifying the base station of control information including the determination result of the determination means.

Further, according to a third aspect of the present invention, there is provided a mobile station that performs communication with a base station using a scramble code characterized by comprising: a determination means for determining, upon reception of a signal transmitted from the base station by communication using an initialization scramble code selected from among a plurality of previously determined scramble codes, whether a candidate scramble code selected from among code series other than the initialization scramble code is usable or not in communication; and a notification means for notifying the base station of control information including the determination result of the determination means.

The mobile station according to the present invention may further comprise a means for selecting the candidate scramble code from among the plurality of scramble codes. The determination means may include a means for measuring a correlation value between the signal transmitted from the base station and candidate scramble code and determining, based on the measured correlation value, whether the candidate scramble code is usable or not in communication. The determination means may include a means for determining whether the candidate scramble code is usable or not in communication upon reception of a predetermined control signal from the mobile station. The notification means may include a means for notifying the base station of at least one of control information indicating that the candidate scramble code is determined to be usable in communication and control information indicating that the candidate scramble code is determined to be unusable.

Further, according to a fourth aspect of the present invention, there is provided a base station that performs communication with a mobile station using a scramble code characterized by comprising: a first communication means for determining an initialization scramble code from among a plurality of previously determined scramble codes and using the determined initialization scramble code to perform communication; and a second communication means for determining a service scramble code from the candidate scramble codes based on the control information including a determination result indicating whether a candidate scramble code selected from among code series other than the initialization scramble code is usable or not in communication, which is notified from the mobile station, and using the determined service scramble code to perform communication.

The base station according to the present invention may further comprise a means for selecting the candidate scramble code from the plurality of scramble codes and notifying the mobile station of the selected candidate scramble code. The first communication means may include a means for selecting the initialization scramble code from among one or more previously assigned initialization scramble codes in the plurality of previously set scramble codes. The first communication means may include a means for selecting the initialization scramble code from among the plurality of previously set scramble codes. The second communication means may include a means for determining the candidate scramble code as the service scramble code based on the total number of notifications of the control information transmitted from the mobile station and total number of notifications of control information indicating that the candidate scramble code is determined to be usable in communication or total number of notifications of control information indicating that the candidate scramble code is determined to be unusable in communication.

Further, according to a fifth aspect of the present invention, there is provided an operation method of a mobile station that performs communication with a base station using a scramble code, characterized by comprising the steps of: determining, upon reception of a signal transmitted from the base station by communication using an initialization scramble code selected from among a plurality of previously determined scramble codes, whether a candidate scramble code selected from among code series other than the initialization scramble code is usable or not in communication; and notifying the base station of control information including the determination result.

Further, according to a sixth aspect of the present invention, there is provided an operation method of a base station that performs communication with a mobile station using a scramble code, characterized by comprising the steps of: determining an initialization scramble code from among a plurality of previously determined scramble codes; using the determined initialization scramble code to perform communication; determining a service scramble code from the candidate scramble codes based on the control information including a determination result indicating whether a candidate scramble code selected from among code series other than the initialization scramble code is usable or not in communication, which is notified from the mobile station; and using the determined service scramble code to perform communication.

Further, according to a seventh aspect of the present invention, there is provided an operation program of a mobile station that performs communication with a base station using a scramble code, characterized by allowing a computer to execute the steps of: determining, upon reception of a signal transmitted from the base station by communication using an initialization scramble code selected from among a plurality of previously determined scramble codes, whether a candidate scramble code selected from among code series other than the initialization scramble code is usable or not in communication; and notifying the base station of control information including the determination result.

Further, according to an eighth aspect of the present invention, there is provided an operation program of a base station that performs communication with a mobile station using a scramble code, characterized by allowing a computer to execute the steps of: determining an initialization scramble code from among a plurality of previously determined scramble codes; using the determined initialization scramble code to perform communication; determining a service scramble code from the candidate scramble codes based on the control information including a determination result indicating whether a candidate scramble code selected from among code series other than the initialization scramble code is usable or not in communication, which is notified from the mobile station; and using the determined service scramble code to perform communication.

Advantages of the Invention

According to the present invention, it is possible to provide a method in which a base station autonomously selects a scramble code without identification of scramble codes of base stations surrounding a target base station while suppressing the calculation amount and power consumption of a mobile station and reducing notification information between the base station and mobile station to the minimum.

BRIEF DESCRIPTION OF THE DRAWINGS

FIG. 3 is a view for explaining the entire code series including an initialization scramble code and a candidate scramble code;

FIG. 4 is a view for explaining the content of a scramble code management table of a code information storage section;

FIG. 5 is a block diagram showing a configuration of a mobile station according to the first exemplary embodiment of the present invention;

FIG. 6 is a flowchart showing the operation of the base station according to the first exemplary embodiment of the present invention;

FIG. 9 is a flowchart showing the operation of the base station according to the second exemplary embodiment of the present invention;

FIG. 10 is a flowchart showing the operation of the mobile station according to the second exemplary embodiment of the present invention;

FIG. 11 is a flowchart showing the operation of the base station according to a third exemplary embodiment of the present invention;

FIG. 12 is a flowchart showing the operation of the mobile station according to the third exemplary embodiment of the present invention;

FIG. 13 is a view for explaining the entire configuration of a conventional mobile communication system where a central node is provided;

FIG. 14 is a view for explaining the entire configuration of a conventional mobile communication system where a central node is not provided;

FIG. 15 is a flowchart showing the operation of a base station in a conventional system; and FIG. 16 is a flowchart showing the operation of a mobile station in a conventional system.

EXPLANATION OF REFERENCE SYMBOLS

10: Mobile communication system
11: Base station
12: Mobile station
CL: Service area (cell)

DESCRIPTION OF EXEMPLARY EMBODIMENTS

Preferred exemplary embodiments for embodying a mobile communication system, its scramble code assigning method, a mobile station, and a base station according to the present invention will be described in detail with reference to the accompanying drawings.

First Exemplary Embodiment

Figure 1:
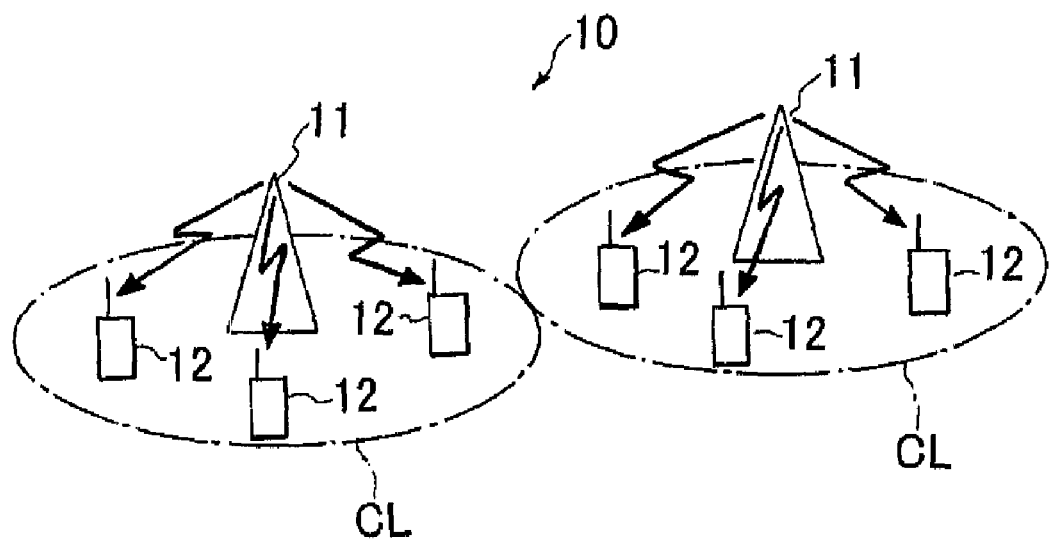
FIG. 1 is a view for explaining the entire configuration of a mobile radio system according to a first exemplary embodiment of the present invention.

FIG. 1 is a view showing a mobile communication system according to a first exemplary embodiment of the present invention. The mobile communication system according to the present exemplary embodiment is applied to a system using, e.g., a CDMA (Code Division Multiple Access) method. However, the present invention is by no means limited thereto. Alternatively, the mobile communication system according to the present exemplary embodiment can be applied to a system using any radio access system such as an FDMA (Frequency Division Multiple Access) method and a TDMA (Time Division Multiple Access) method as long as it performs radio communication between a base station and a mobile station by using a base station specific scramble code.

Referring to FIG. 1, in a mobile communication system 10 according to the present exemplary embodiment, a plurality (two in this example) of radio base station (hereinafter, abbreviated as "base station") 11, 11 are provided on a not-shown network. Each of the base stations 11, 11 performs radio communication with a plurality (three in this example) of mobile stations 12 . . . 12 within its service area (cell) CL. At the communication time, the scramble code which is a base station specific identifier is used. The cells are distinguished from one another by the scramble code.

Figure 2:
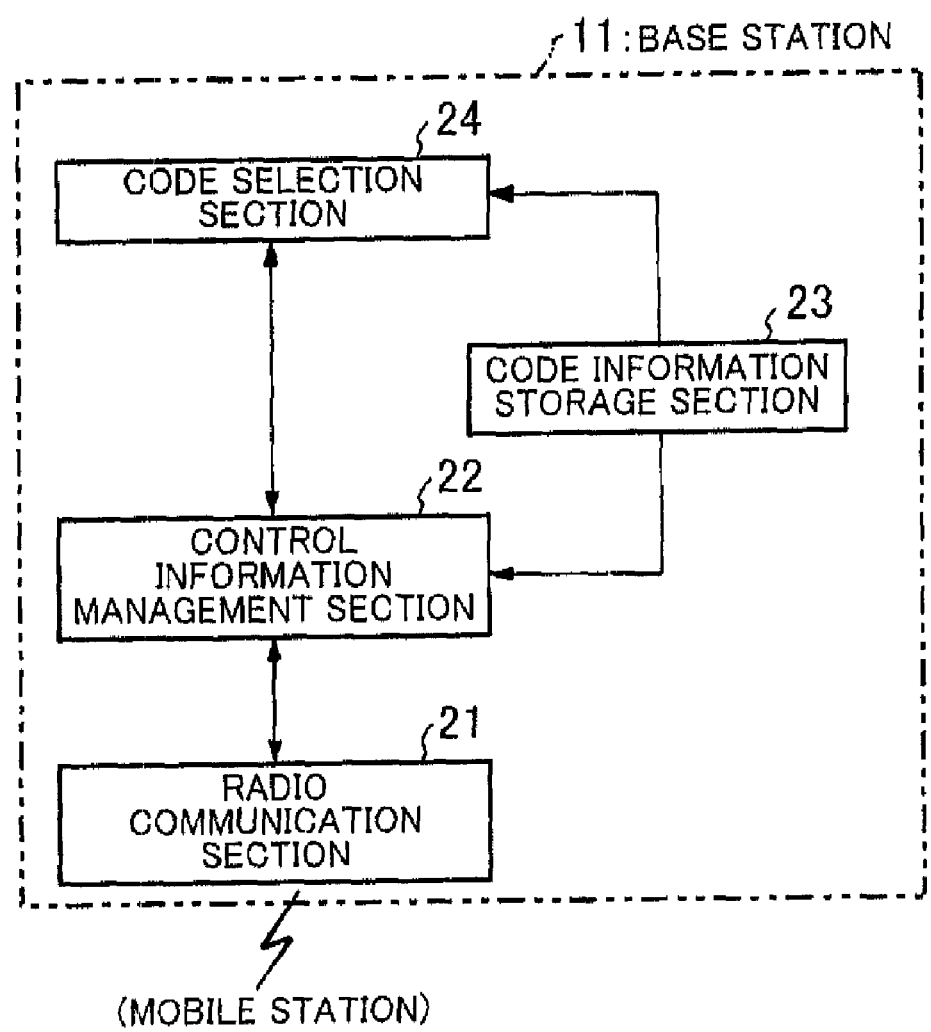
FIG. 2 is a block diagram showing a configuration of a base station according to the first exemplary embodiment of the present invention.

With reference to FIGS. 2 to 4, the base station 11 according to the present exemplary embodiment will be described.

FIG. 2 is a block diagram showing a configuration of the base station 11 according to the present exemplary embodiment. Referring to FIG. 2, the base station 11 functionally includes a radio communication section 21, a control information management section 22 connected to the signal I/O side of the radio communication section 21, a code information storage section 23 connected to the signal I/O side of the control information management section 22, and a code selection section 24 connected to both the signal I/O sides of the control information management section 22 and code information storage section 23. Further, a memory (not shown) for retaining information concerning later-described code series of the scramble code is provided in the base station 11.

The radio communication section 21 includes a known circuit configuration (e.g., antenna, duplexer, power amplifier, modulator and demodulator circuit, scramble code generation circuit) and performs radio communication with the mobile station 12 located within the cell CL of the base station 11 according to the operation of the circuit using a scramble code (initialization scramble code, service scramble code) generated by a scramble code generation circuit (not shown). Through the radio communication, the radio communication section 21 receives a signal from the mobile station 12 and transmits the received signal to the control information management section 22 and, at the same time, transmits a signal including control information which is generated by the control information management section 22 to the mobile station 12.

The control information management section 22 is constituted by, e.g., a circuit on which a microcomputer having a CPU that operates under program control is mounted. When the CPU executes a program command that has been previously set in a recording medium such as a ROM, the control information management section 22 performs processing concerning generation and extraction of control information in cooperation with the radio communication section 21, code selection section 24, and code information storage section 23.

For example, the control information management section 22 generates control information to be notified to the mobile station 12 based on information of the scramble code (see initialization scramble code, candidate scramble code, service scramble code to be described later) selected by the scramble code selection section 24 and information of a scramble code management table (to be described later) retained in the code information storage section 23 and transfers the generated control information to the radio communication section 21. The generated control information includes control information for requesting the mobile station 12 to perform interference measurement, control information for notifying the mobile station 12 of the candidate scramble code number, and control information for notifying the mobile station 12 of the service scramble code. In the case where a 3G (third generation mobile phone) standard channel is used, these control information is notified to the mobile station 12 using a BCH (Broadcast Channel) which is a downlink shared channel for transmitting notification information such as system information and cell information.

Further, the control information management section 22 extracts control information notified from the mobile station 12 from a signal received by the radio communication section 21. The control information extracted includes, e.g., control information indicating whether the candidate scramble code from the mobile station 12 is usable or not. The extracted control information is transferred to the code information storage section 23 and code selection section 24 depending on the content of the control information.

The code selection section 24 is constituted by, e.g., a circuit on which a microcomputer having a CPU that operates under program control is mounted. The circuit may integrally or separately be formed with/from the control information management section 22. When the CPU executes a program command that has been previously set in a recording medium such as a ROM, the code selection section 24 performs processing such as selection of the initialization scramble code, selection of the candidate scramble code to be notified to the mobile station 12, and selection of the service scramble code. The selected scramble code is transferred to the control information management section 22.

These scramble codes are obtained by grouping the previously set code series of the scramble code. The code series, which is necessary at data transmission time, is generated by a scramble code generation circuit (not shown) included in the radio communication section 21 and retained in a memory (not shown) of the base station 11. An example of the code series is shown in FIG. 3.

Assuming that the total number of the scramble codes of the code series shown in FIG. 3 is N, only n (n<N) (1th to n-th code series in FIG. 3) code series are previously determined as "initialization scramble codes" which are used only for setting the scramble code at base station start-up time. In this case, the number of the set initialization scramble codes may be one (n=1) or a plural (n>1). Then, the remaining (N−n) code series (n+1-th to N-th code series in FIG. 3) are determined as "candidate scramble codes". Thereafter, the candidate scramble codes are used to perform interference measurement as described later and a candidate scramble code that has been determined as the usable scramble code is determined as "service scramble code". It is desirable that the selection of the scramble codes be performed randomly so as not to introduce bias.

The code information storage section 23 is constituted by, e.g., a circuit on which a microcomputer having a CPU that operates under program control is mounted. The circuit may integrally or separately be formed with/from the control information management section 22. The code information storage section 23 sets a scramble code management table (to be described later) in a recording medium such as a RAM, as well as updates information of the scramble code management table on the recording medium based on the control information from the mobile station 12 which has been extracted by the control information management section 22. The information of the scramble code management table can be referred to from the control information management section 22 and code selection section 24.

FIG. 4 shows an example of the scramble code management table of the code information storage section 23. In the example of FIG. 3, the scramble code management table stores, for each candidate scramble code number (number assigned to the scramble code), the number of notifications indicating that a target candidate scramble code is usable (the number of "availability" notifications) and total number of notifications (which includes the number of usable scramble codes and the number of unusable scramble codes), which are transmitted, from the mobile station 12 in the cell CL, in response to the interference measurement request asking whether the target candidate scramble code is usable or not. The example of FIG. 3 shows that the base station 11 has received 85, 80, and 38 availability notifications and 100, 100, and 40 total numbers of notifications with respect to the scramble code numbers 20, 25, and 30, respectively.

With reference to FIG. 5, the mobile station 12 according to the present exemplary embodiment will be described.

Referring to FIG. 5, the mobile station 12 includes a radio communication section 31, a cell search section 32 and a normal reception section 34 which are connected to the signal output side of the radio communication section 31, a scramble code determination section 33 connected to the signal output side of the cell search section 32, a control information management section 35 connected to the signal output side of the scramble code determination section 33 in parallel to the normal reception section 34, an interference measurement section 36 connected to the signal output side of the control information management section 35, and a code determination section 37 connected to the signal output side of the interference measurement section 36. The signal output side of the code determination section 37 is connected to the control information management section 35, and the signal output side of the control information management section 35 is connected to the radio communication section 31.

Further, a memory (not shown) for retaining information concerning the abovementioned code series (initialization scramble code, candidate scramble code) of the scramble code is provided in the mobile station 12. The mobile station 12 may receive the information itself of the code series through a packet sent from the base station 11 and store it in the memory. Alternatively, the mobile station 12 may receive only index information associated with the code series information shared with the base station 11. In this case, the mobile station 12 identifies the code series information from the index information and stores the identified code series information in the memory. Further alternatively, the mobile station 12 may previously retain a generator polynomial for code generation shared with the base station 11 and only receive information of parameters to be input to the generator polynomial. In this case, the mobile station 12 uses the generator polynomial to generate information of the code series and stores it in the memory.

The radio communication section 31 is constituted by a known circuit configuration (e.g., antenna, duplexer, and power amplifier) and performs radio communication with the base station 11 according to the operation of the circuit using the scramble code (initialization scramble code, service scramble code). Through the radio communication, the radio communication section 31 receives a signal from the base station 11 and transmits the received signal to the cell search section 32 and normal reception section 34 and, at the same time, transmits a signal including control information which is generated by the control information management section 35 to the base station 11.

The cell search section 32 is constituted by a known circuit configuration and performs, according to the operation of the circuit, cell search based on a reception signal from the radio communication section 31 to thereby identify the scramble code of the base station 11 to be connected to the corresponding mobile station 12 and transmits the identification result to the scramble code determination section 33. More specifically, in identifying the scramble code using the cell search, the cell search section 32 calculates correlations between a reception signal and previously stored known scramble codes and identifies the code series having the maximum correlation value as a scramble code that is being used by the base station 11.

The scramble code determination section 33 is constituted by a known circuit configuration and, according to the operation of the circuit, checks the position of the scramble code identified by the cell search section 32 in the known scrambles codes that have previously been stored in the memory (not shown) of the mobile station 12 to determine whether identified scramble code exists within the range of the initialization scramble code. In the case where the identified scramble code exists within the range of the initialization scramble code, the processing is handed to the control information management section 35, while in the case where the identified scramble code does not exist within the range of the initialization scramble code, the processing is handed to the normal reception section 34.

The normal reception section 34 has a known reception circuit configuration (e.g., demodulating circuit) and performs, according to the operation of the circuit, normal reception operation to demodulate a reception signal from the radio communication section 31 in the case where the scramble code identified by the cell search section 32 does not exist within the range of the initialization scramble code.

The control information management section 35 is constituted by e.g., a circuit on which a microcomputer having a CPU that operates under program control is mounted. When the CPU executes a program command that has been previously set in a recording medium such as a ROM, the control information management section 35 performs processing concerning generation and extraction of control information.

For example, the control information management section 35 generates control information to be notified to the base station 11 based on the determination result from the scramble code determination section 33, determination result from the code determination section 37, or the like and transfers the generated control information to the radio communication section 31. The generated control information includes control information indicating whether the candidate scramble code is usable or not. In the case where a 3G (third generation mobile phone) standard channel is used, the control information is notified to the base station 11 using a RACH (Random Access Channel) which is an uplink shared channel or a DCH (Dedicated Channel) individually assigned to the mobile station 12.

Further, the control information management section 35 extracts control information notified from the base station 11 from a signal received by the radio communication section 31. The control information extracted includes, e.g., control information for requesting execution of the interference measurement which is transmitted from the base station 11, control information for indicating the candidate scramble code number which is transmitted from the base station 11, and control information for indicating the service scramble code which is transmitted from the base station 11. The interference measurement request and candidate scramble code number are transferred to the interference measurement section 36. The service scramble code is transferred to the radio communication section 31.

The interference measurement section 36 is constituted by, e.g., a circuit on which a microcomputer having a CPU that operates under program control is mounted. The circuit may integrally or separately be formed with/from the control information management section 35. When the CPU executes a program command that has been previously set in a recording medium such as a ROM, the interference measurement section 36 calculates correlation between a reception signal from the radio communication section 31 and candidate scramble code notified from the base station 11 which is included in the control information extracted by the control information management section 35 and measures the interference level of the candidate scramble code. A result of the interference measurement is transferred to the code determination section 37.

The code determination section 37 is constituted by, e.g., a circuit on which a microcomputer having a CPU that operates under program control is mounted. The circuit may integrally or separately be formed with/from the control information management section 35. When the CPU executes a program command that has been previously set in a recording medium such as a ROM, the code determination section 37 determines whether the candidate service scramble code notified from the base station 11 is usable or not based on the interference level measured by the interference measurement section 36. The determination result is transferred to the control information management section 35.

Next, with reference to the flowchart of FIG. 6, the operation of the base station 11 will be described in detail.

Upon activation, the base station 11 uses the code selection section 24 to randomly select one from a group (see FIG. 3) consisting of a plurality of initialization scramble codes and uses the selected initialization scramble code to start communication with the mobile station 12 within the cell CL of the base station 11 itself via the radio communication section 21 (step S1).

The base station 11 then uses the code selection section 24 to randomly select one from a group (group consisting of candidate scramble codes) (see FIG. 3) other than the group consisting of the initialization scramble codes (step S2).

The base station 11 then uses the control information management section 22 to generate control information corresponding to an interference measurement request and transmits, via the radio communication section 21, the generated control information to the mobile station 12 within the cell CL, to thereby request the mobile station 12 to perform interference measurement (step S3). After that, the base station 11 uses the control information management section 22 to generate control information for notifying the mobile station 12 of the candidate scramble code selected in step S2 and transmits, via the radio communication section 21, the control information to the mobile station 12 (step S4).

Then, the base station 11 receives, via the radio communication section 21, notification indicating whether the candidate scramble code is usable or not which is transmitted from the mobile station 12 in response to the interference measurement request (step S5) and uses the code information storage section 23 to update, in the scramble code management table (see FIG. 4), information concerning the number of availability notifications corresponding to the candidate scramble code and the total number of notifications based on the received notification (step S6).

The base station 11 then uses the code selection section 24 to determine whether the total number of notifications (samples) updated in the scramble code management table exceeds a required number of notifications (threshold) (i.e., whether condition of [threshold<number of samples] is satisfied) (step S7).

In the case where the condition of [threshold<number of samples] is not satisfied and, accordingly, it is determined that the number of notifications updated in the scramble code management table is not more than the required number of notifications, i.e., the number of notifications is determined to be insufficient (NO in step S7), the flow returns to step S5 where the base station 11 repeats the same processing. On the other hand, in the case where the condition of [threshold<number of samples] is satisfied and, accordingly, it is determined that the number of notifications updated in the scramble code management table exceeds the required number of notifications, i.e., the number of notifications is determined to be sufficient (YES in step S7), the base station 11 uses the code selection section 24 to determine whether the ratio (availability ratio=number of availability notifications/total number of notifications) of the number of availability notifications relative to the total number of notifications updated in the scramble code management table exceeds a predetermined threshold (i.e., whether condition of [threshold<availability ratio] is satisfied) (step S8).

When the threshold is large, it is possible to set a more appropriate service scramble code having less interference, whereas the time and amount of calculation required for code setting increase, resulting in an increase in cost. When the threshold is small, the time and amount of calculation required for code setting decreases to reduce cost, whereas the set service scramble code is likely to have large interference. Thus, it is desirable to set an optimum threshold in view of the above trade-off.

In the case where it is determined that the condition of [threshold<availability ratio] is not satisfied and, accordingly, the ratio of the number of availability notifications relative to the total number of notifications updated in the scramble code management table is less than the threshold (No in step S8), the flow returns to S2 where the base station 11 repeats the same processing. On the other hand, in the case where it is determined that the condition of [threshold<availability ratio] is satisfied and, accordingly, the ratio of the number of availability notifications relative to the total number of notifications updated in the scramble code management table exceeds the threshold (YES in step S8), the base station 11 uses the code selection section 24 to determine that the corresponding candidate scramble code is used as the service scramble code (step S9).

Subsequently, the base station 11 uses the control information management section 22 to generate control information for notifying the service scramble code determined in step S9 and its change timing and notify the mobile station 12 of the control information via the radio communication section 21 (step S10). Then, the base station 11 updates the service scramble code (step S11) and uses the updated service scramble code to start communication with the mobile station 12 via the radio communication section 21.

In the present exemplary embodiment, two comparisons, i.e., comparison between the number of samples and a first threshold in step S7 and comparison between the availability ratio and a second threshold in step S8 are performed. Although these comparisons are required for determining whether the candidate scramble code can be used or not, both the comparisons need not be performed but only one of the comparisons may be used. For example, in the case where only the comparison concerning the availability ratio is performed, the availability ratio is calculated every time notification (sample) is transmitted from the mobile station 12 and, after a predetermined wait time has elapsed, the available ratio is compared with the threshold for determination. It is desirable that the wait time for obtaining the samples in this case be set long enough for the processing to be carried out with reliability.

Next, with reference to the flowchart of FIG. 7, the operation of the mobile station 12 will be described in detail.

At the time of activation, the mobile station 12 uses the cell search section 32 to perform cell search for identifying the scramble code of the base station 11 with which the mobile station 12 performs communication based on a reception signal from the radio communication section 31 (step S21). Then, the mobile station 12 determines whether the scramble code identified by the cell search section 32 is the initialization scramble code or not (step S22). This determination is made by the scramble code determination section 33 based on whether the scramble code identified by the cell search section 32 coincides with the initialization scramble code that has previously been retained in a memory (not shown).

In the case where the scramble code identified by the cell search is not the initialization scramble code (NO in step S22), the mobile station 12 switches the processing of the scramble code determination section 33 to processing of the normal reception section 34 and, afterward, uses the normal reception section 34 to perform normal reception operation via the radio communication section 31 (step S31). On the other hand, in the case where the scramble code identified by the cell search is the initialization scramble code (YES in step S22), the mobile station 12 switches the processing of the scramble code determination section 33 to processing of the control information management section 35 and uses the control management information section 35 to determine whether control information corresponding to the interference measurement request is included in the reception signal from the base station 11 (step S23).

In the case where the control information corresponding to the interference measurement request is included in the reception signal from the base station 11 (YES in step S23), the mobile station 12 receives control information corresponding to the candidate scramble code from the base station 11 via the radio communication section 31 (step S24).

Subsequently, the mobile station 12 uses the interference measurement section 36 to calculate correlation between the reception signal from the base station 11 and the candidate scramble code notified by the control information from the base station 11 to thereby measure an interference level (step S25).

The mobile station 12 then uses the code determination section 37 to compare the interference value (interference level) measured in step S25 with a previously set allowable interference value (threshold) to thereby determine whether the candidate scramble code notified from the base station 11 is usable or not (i.e., whether the condition of [threshold>interference level] is satisfied or not) (step S26).

When the threshold is small, it is possible to set a more appropriate service scramble code having less interference, whereas the time and amount of calculation required for code setting increase, resulting in an increase in cost. When the threshold is large, the time and amount of calculation required for code setting decreases to reduce cost, whereas the set service scramble code is likely to have large interference. Thus, it is desirable to set an optimum threshold in view of the above trade-off.

In the case where it is determined that the condition of [threshold>interference level] is satisfied and, accordingly, the candidate scramble code is usable (YES in step S26), the mobile station 12 uses the control information management section 35 to generate control information corresponding to the determination result (availability) and notify the base station 11 of the control information via the radio communication section 31 (step S27). On the other hand, in the case where it is determined that the condition of [threshold>interference level] is not satisfied and, accordingly, the candidate service scramble code is unusable (NO in step S26), the mobile station 12 uses the control information management section 35 to generate control information corresponding to the determination result (nonavailability) and notify the base station 11 of the control information via the radio communication section 31 (step S28). In this case, the flow returns to step S23 where the mobile station 12 repeats the same processing.

On the other hand, it is determined in step S23 that the control information corresponding to the interference measurement request is not included in the reception signal from the base station 11 (NO in step S23), the mobile station 12 receives control information corresponding to the service scramble code and its change timing from the base station 11 via the radio communication section 31 (step S29). The mobile station 12 then applies the notified service scramble code at the notified change timing based on the control information and uses the applied service scramble code to start communication with the base station 11 via the radio communication section 31 (step S30).

As described above, in the present exemplary embodiment, the base station 11 starts communication by using a predetermined initialization scramble code used only at its activation time. Then, the mobile station 12 determines whether the scramble code identified upon cell search time is the initialization scramble code. Only when the scramble code is the initialization scramble code, the mobile station 12 selects/determines the candidate scramble code from the code series other than the initialization scramble codes, determines whether the candidate scramble code can be used in communication, and notifies the base station 11 of the control information including the determination result. The base station 11 stores the control information and, according to the control information, determines a service scramble code to be actually used, and applies the decided service scramble code to start communication.

Thus, according to the present exemplary embodiment, the mobile station 12 performs the interference measurement by calculating correlation not using all the scramble codes but using only the candidate scramble code, whereby it is possible to reduce the amount of calculation and power consumption of the mobile station 12.

Further, according to the present exemplary embodiment, only when the initialization scramble code is identified, the mobile station 12 enters a mode that performs the interference measurement and notifies the base station 11 of information. That is, notification is made only when the base station 11 requires the control information, thereby reducing the amount of information notified and the number of times of communication between the base station 11 and the mobile station 12.

Further, according to the present exemplary embodiment, the base station 11 takes the initiative to autonomously select the service scramble code, in cooperation with the mobile station 12, not by duplicate determination but by only the interference measurement.

In the present exemplary embodiment, the candidate scramble code to be notified to the mobile station 12 may be one or plural as described above. In the case where a plurality of the initialization scramble codes are used, they may be selected randomly, manually, or based on the serial number of the base station 11. When the plurality of the initialization scramble codes are used, the probability of code collision at the time of simultaneous activation of a plurality of the base stations 11 can be lowered.

Second Exemplary Embodiment

A mobile communication system according to a second exemplary embodiment will be described in detail. The candidate scramble code is selected by the base station in the abovementioned first exemplary embodiment, whereas in the second exemplary embodiment, the candidate scramble code is selected by the mobile station.

The mobile communication system according to the present exemplary embodiment has the same configuration as that shown in FIG. 1. The base station according to the present exemplary embodiment has the same configuration as that shown in FIG. 2 except that the code selection section 24 need not select the candidate scramble code.

Figure 8:
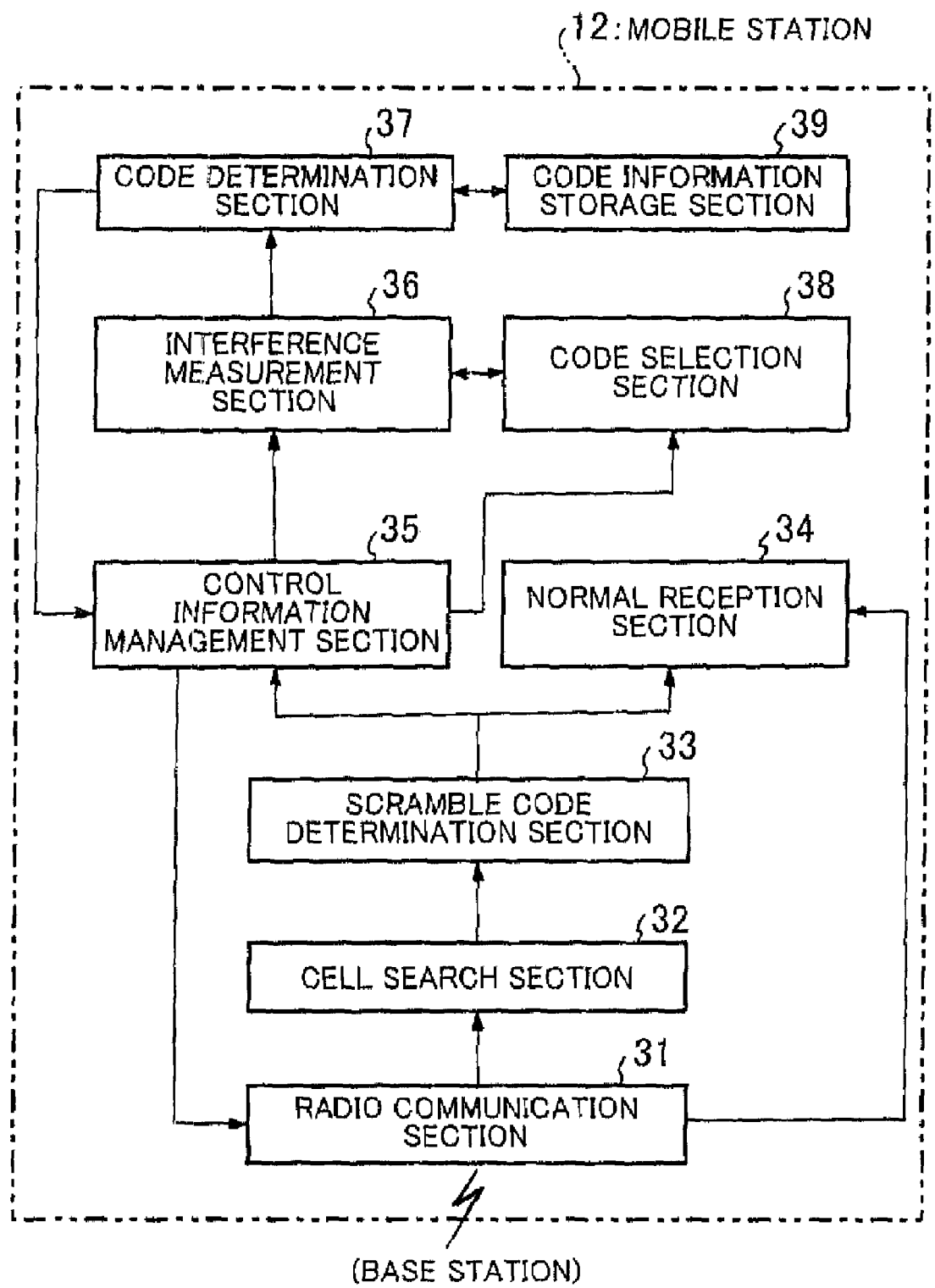
FIG. 8 is a block diagram showing a configuration of a mobile station according to a second exemplary embodiment of the present invention.

FIG. 8 shows a configuration of the mobile station 12 according to the present exemplary embodiment. In FIG. 8, the same reference numerals as those in FIG. 5 denote the same parts as those in FIG. 5.

Figure 7:
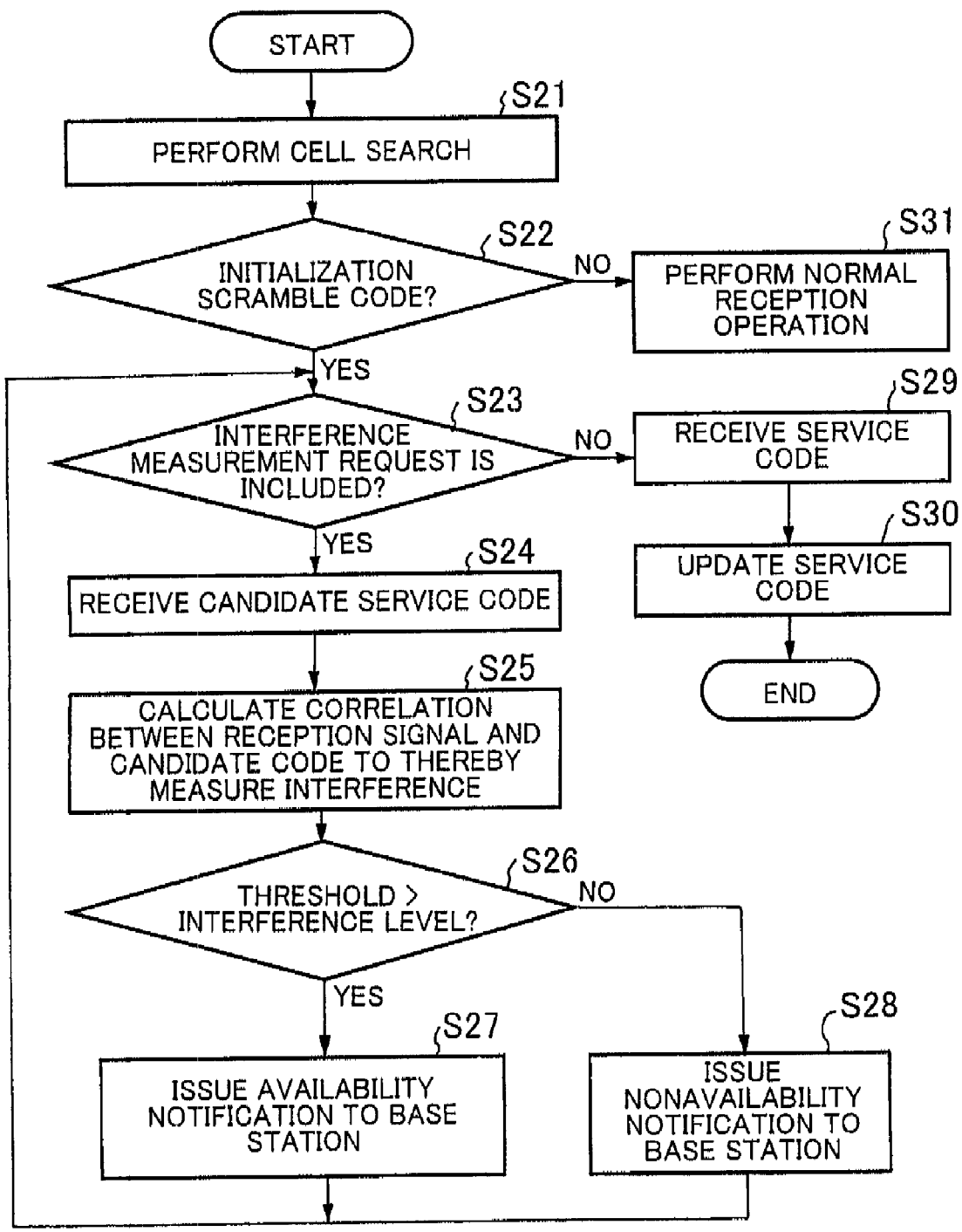
FIG. 7 is a flowchart showing the operation of the mobile station according to the first exemplary embodiment of the present invention.

Referring to FIG. 7, the mobile station 12 functionally includes, in addition to the same components (radio communication section 31, cell search section 32, scramble code determination section 33, normal reception section 34, control information management section 35, interference measurement section 36, code determination section 37) as those shown in FIG. 5, a code selection section 38 connected to the control information management section 35 and interference measurement section 36 and a code information storage section 39 connected to the code determination section 37.

The code selection section 38 is constituted by, e.g., a circuit on which a microcomputer having a CPU that operates under program control is mounted. The circuit may integrally or separately be formed with/from the control information management section 35. When the CPU executes a program command that has been previously set in a recording medium such as a ROM, the code selection section 38 determines the order of the numbers of the candidate scramble codes to be subjected to the interference measurement. The determined order is transferred to the interference measurement section 36.

In order to reduce the time required for selecting the scramble code, the order of the numbers of the candidate scramble codes to be subjected to the interference measurement is preferably the same among all the mobile stations 12 located within the same cell CL. This is realized by the following procedure. That is, assuming that the initialization scramble code number that the mobile station 12 has identified upon the cell search time is M and that the first number of the service scramble codes is L, the order of the numbers of the candidate scramble codes to be subjected to the interference measurement is set to L+nM (n is a natural number).

Assuming that the number of the scramble codes is 512 and that numbers from 1 to 32 are assigned to the initialization scramble codes, the number of the service scramble codes is 480 (numbers from 33 to 512 are assigned to the service scramble codes). Assuming that the mobile station 12 identifies 12th scramble code by the cell search of the cell search section 32, the interference measurement is performed in the order of 45 (33+12), 57 (33+12×2), . . . .

The code information storage section 39 is constituted by, e.g., a circuit on which a microcomputer having a CPU that operates under program control is mounted. The circuit may integrally or separately be formed with/from the control information management section 35. The code information storage section 39 stores, in a recording medium such as a RAM, the candidate scramble code number determined by the code determination section 37 and information indicating whether the candidate scramble code number is usable or not in association with each other.

Next, with reference to the flowchart of FIG. 9, the operation of the base station 11 will be described in detail.

Upon activation, the base station 11 uses the code selection section 24 to select one from a group (see FIG. 3) consisting of a plurality of initialization scramble codes and uses the selected initialization scramble code to start communication with the mobile station 12 within the cell CL of the base station 11 itself via the radio communication section 21 (step S41).

The base station 11 then uses the control information management section 22 to generate control information corresponding to an interference measurement request and transmits, via the radio communication section 21, the generated control information to the mobile station 12 within the cell CL, to thereby request the mobile station 12 to perform interference measurement (step S42).

Then, the base station 11 receives, via the radio communication section 21, control information corresponding to usable candidate scramble codes from the mobile station 12 (step S43) and uses the code information storage section 23 to update, in the scramble code management table, information of the usable candidate scramble codes and the number of availability notifications and the total number of notifications corresponding to each of the candidate scramble codes based on the received notification (step S44).

The base station 11 then uses the code selection section 24 to determine whether the total number of notifications (samples) updated in the scramble code management table exceeds a required number of times of notification (threshold) (i.e., whether condition of [threshold<number of samples] is satisfied), to thereby determine whether a required number of times of notification has been ensured (step S45).

In the case where it is determined in step S45 that the condition of [threshold<number of samples] is not satisfied and, accordingly, the number of samples is insufficient (NO in step S45), the flow returns to step S43 where the base station 11 repeats the same processing. On the other hand, in the case where it is determined that the condition of [threshold<number of samples] is satisfied and, accordingly, the number of notifications (number of samples) is sufficient (YES in step S45), the base station 11 uses the code selection section 24 to determine whether the ratio (availability ratio=number of availability notifications/total number of notifications) of the number of availability notifications relative to the total number of notifications updated in the scramble code management table exceeds a predetermined threshold (i.e., whether condition of [threshold<availability ratio] is satisfied) (step S46).

When the threshold is large, it is possible to set a more appropriate service scramble code having less interference, whereas the time and amount of calculation required for code setting increase, resulting in an increase in cost. When the threshold is small, the time and amount of calculation required for code setting decreases to reduce cost, whereas the set service scramble code is likely to have large interference. Thus, it is desirable to set an optimum threshold in view of the above trade-off.

In the case where it is determined that the condition of [threshold<availability ratio] is not satisfied and, accordingly, the number of availability notifications updated in the scramble code management table is less than the threshold (No in step S46), the flow returns to S42 where the base station 11 repeats the same processing. On the other hand, in the case where it is determined that the condition of [threshold<availability ratio] is satisfied and, accordingly, the number of availability notifications updated in the scramble code management table exceeds the threshold (YES in step S46), the base station 11 uses the code selection section 24 to determine that the corresponding candidate scramble code is used as the service scramble code (step S47).

Subsequently, the base station 11 uses the control information management section 22 to generate control information for notifying the service scramble code determined in step S67 and its change timing and notify the mobile station 12 of the control information via the radio communication section 21 (step S48). Then, the base station 11 updates the service scramble code (step S49) and uses the updated service scramble code to start communication with the mobile station 12 via the radio communication section 21.

Next, with reference to the flowchart of FIG. 10, the operation of the mobile station 12 will be described in detail.

At the time of activation, the mobile station 12 uses the cell search section 32 to perform cell search for identifying the scramble code of the base station 11 with which the mobile station 12 performs communication based on a reception signal from the radio communication section 31 (step S51). Then, the mobile station 12 determines whether the scramble code identified by the cell search section 32 is the initialization scramble code or not (step S52). This determination is made by the scramble code determination section 33 based on whether the scramble code identified by the cell search section 32 coincides with the initialization scramble code that has previously been retained in a memory (not shown).

In the case where the scramble code identified by the cell search is not the initialization scramble code (NO in step S52), the mobile station 12 switches the processing of the scramble code determination section 33 to processing of the normal reception section 34 and, afterward, uses the normal reception section 34 to perform normal reception operation via the radio communication section 31 (step S63). On the other hand, in the case where the scramble code identified by the cell search is the initialization scramble code (YES in step S52), the mobile station 12 switches the processing of the scramble code determination section 33 to processing of the control information management section 35 and uses the control management information section 35 to determine whether control information corresponding to the interference measurement request is included in the reception signal from the base station 11 (step S53).

In the case where the control information corresponding to the interference measurement request is included in the reception signal from the base station 11 (YES in step S53), the mobile station 12 uses the code selection section 38 to determine the order of the candidate scramble codes to be subjected to the interference measurement (step S54). Subsequently, according to the determined order, the mobile station 12 uses the interference measurement section 36 to calculate correlation between the reception signal from the base station 11 and determined candidate scramble codes to thereby measure an interference level (step S55).

The mobile station 12 then uses the code determination section 37 to compare the interference value (interference level) measured in step S55 with a previously set allowable interference value (threshold) to thereby determine whether the candidate scramble code that has been subjected to the interference measurement is usable or not (i.e., whether the condition of [threshold>interference level] is satisfied or not) (step S56).

In the case where it is determined that the condition of [threshold>interference level] is satisfied and, accordingly, the candidate scramble code is usable (YES in step S56), the mobile station 12 stores it as the usable candidate scramble code in the code information storage section 39 (step S57). On the other hand, in the case where it is determined that the condition of [threshold>interference level] is not satisfied and, accordingly, the candidate scramble code is not usable (NO in step S56), the mobile station 12 stores it as the unusable candidate scramble code in the code information storage section 39 (step S58). Then, the flow returns to step S55 where the mobile station 12 repeats the same processing.

Then, the mobile station 12 determines whether a required number (threshold) of the usable candidate scramble codes have been ensured or not (step S59). This determination is made by the code determination section 37 comparing the number of usable candidate scramble codes stored in the code information storage section 39 with a previously set threshold corresponding to the required number of codes. The comparison result is transferred to the control information management section 35. The threshold used here is set depending on the amount of overhead and number of times of communication with the base station 11. For example, when the threshold (=required number of codes) is set to 1, the amount of overhead becomes minimum, whereas the number of times of communication with the base station 11 increases. Conversely, when the threshold is large, although the amount of calculation and amount of overhead for interference measurement are increased, the number of times of communication with the base station 11 can be reduced. Thus, it is desirable to set an optimum threshold in view of the above trade-off.

In the case where a required number of the usable candidate scramble codes have not been ensured (NO in step S59), the flow returns to step S55 where the mobile station 12 repeats the same processing. On the other hand, in the case where a required number of the usable candidate scramble codes have been ensured (YES in step S59), the mobile station 12 uses the control information management section 35 to generate control information for notifying the base station 11 of the usable candidate scramble code and notify the base station 11 of the control information via the radio communication section 31 (step S60). After that, the flow returns to step S53 where the mobile station 12 repeats the same processing.

On the other hand, it is determined in step S53 that the control information corresponding to the interference measurement request is not included in the reception signal from the base station 11 (NO in step S53), the mobile station 12 receives control information corresponding to the service scramble code and its change timing from the base station 11 (step S61). The mobile station 12 then applies the notified service scramble code at the notified change timing based on the control information and uses the applied service scramble code to start communication with the base station 11 via the radio communication section 31 (step S62).

Thus, according to the present exemplary embodiment, the mobile station 12 performs the interference measurement by calculating correlation not using all the scramble codes but using only the candidate scramble codes, whereby it is possible to reduce the amount of calculation and power consumption of the mobile station 12.

Further, according to the present exemplary embodiment, only when the initialization scramble code is identified, the mobile station 12 enters a mode that performs the interference measurement and notifies the base station 11 of information. That is, notification is made only when the base station 11 requires the control information, thereby reducing the amount of information notified and the number of times of communication between the base station 11 and the mobile station 12.

Further, the mobile station 12 takes the initiative to autonomously select the service scramble code, in cooperation with the base station 11.

In the present exemplary embodiment, a plurality of candidate scramble codes are selected by the mobile station 12 and notified to the base station 11. Alternatively, however, only one candidate scramble code may be selected by the mobile station 12 and notified to the base station 11. In this case, the service scramble code is adequately selected.

Third Exemplary Embodiment

A mobile communication system according to a third exemplary embodiment will be described in detail. The mobile communication system according to the present exemplary embodiment has the same configuration as that shown in FIG. 1. The base station and mobile station according to the present exemplary embodiment have the same configuration as those shown in FIG. 2 and FIG. 5, respectively. In the above first and second exemplary embodiments, one or predetermined number of initialization scramble codes used only at its activation time are selected from a plurality of previously determined scramble codes, while in the present exemplary embodiment, the initialization scramble code is randomly selected at the activation time from all the previously set scramble codes.

With reference to the flowchart of FIG. 11, the operation of the base station 11 will be described. The base station 11 according to the present exemplary embodiment executes the following steps S71 to S74 in place of step S1 of the first exemplary embodiment.

When being activated, the base station 11 randomly selects the initialization scramble code from the previously determined all groups of the scramble codes (step S71). In this case, for example, one initialization scramble code is randomly selected from N scramble codes. Then, the mobile station 12 uses the selected initialization scramble code to transmit a previously set activation time signal to the mobile station 12 via the radio communication section 21 (step S72).

Then, the base station 11 uses the radio communication section 21 to determine whether a reply packet indicating detection of the activation time signal has been received (step S73). In the case where it is determined that the reply packet indicating detection of the activation time signal has been received from the mobile station 12 (YES in step S73), the base station 11 uses the radio communication section 21 to signal previously set code change information to the mobile station 12 (step S74). On the other hand, in the case where it is determined that the reply packet indicating detection of the activation time signal has not been received from the mobile station 12 (NO in step S73), the flow returns to step S71 where the base station 11 repeats the same processing.

After completion of the processing of step S74, the base station 11 executes the same processing as the first exemplary embodiment (processing from steps S2 to S11).

Although the base station 11 determines the condition of [threshold>availability ratio] (=number of notifications indicating availability/total number of notifications) in step S8, the following processing may be performed in place of this. That is, since the mobile station 12 transmits the reply packet to the base station 11 when the mobile station 12 can receive a signal (activation time signal), the base station 11 can grasp the total number of notifications by counting the number of notifications of the reply packets. Therefore, in the case where the mobile station 12 makes notification of only usable candidate scramble codes or unusable candidate scramble codes, the base station 11 can calculate the availability ratio using the following expressions.

1) In the case where the mobile station 12 makes notification of only usable candidate scramble codes:availability ratio=number of availability notifications/number of notifications of reply packets 2) In the case where the mobile station 12 makes notification of only unusable candidate scramble codes:availability ratio=(number of notifications of reply packets−number of nonavailability notifications/number of notifications of reply packets Thus, the base station 11 can calculate the ratio of availability in the case where the mobile station 12 makes notification of only usable candidate scramble codes or unusable candidate scramble codes by counting the number of notifications of the reply packets and using the counted notifications as the total number of notifications.

Next, with reference to the flowchart of FIG. 12, the operation of the mobile station 12 will be described. The mobile station 11 according to the present exemplary embodiment executes the following steps S81 to S85 in place of steps S21 and S22 of the first exemplary embodiment.

At the time of activation, the mobile station 12 uses the radio communication section 31 to receive the activation time signal from the base station 11 (step S81) and determine whether the signal has been detected or not (step S82). In the case where it is determined that the activation time signal has not been detected (NO in step S82), the flow returns to step S81 where the mobile station 12 repeats the same processing. On the other hand, in the case where it is determined that the activation time signal has been detected (Yes in step S82), the mobile station 12 uses the radio communication section 31 to transmit a reply packet indicating the detection of the activation time signal to the base station 11 (step S83).

The mobile station 12 then uses the radio communication section 31 to determine whether signaling of code change has been received or not from the base station 11 (step S84). In the case where it is determined that the signaling of code change has not been received (NO in S84), the mobile station 12 uses the normal reception section 34 to perform normal reception operation (step S85). On the other hand, in the case where it is determined that the signaling of code change has been received (YES in S84), the mobile station 12 executes the same processing as the first exemplary embodiment (processing from steps S23 to S30).

Although, in the step S27 and S28, both the notification of usable candidate scramble codes and unusable candidate scramble codes are made, only one of the notifications may be made.

Thus, as in the case of the first exemplary embodiment, according to the present exemplary embodiment, the base station 11 takes the initiative to autonomously select the service scramble code, in cooperation with the mobile station 12, not by duplicate determination but by only the interference measurement. In addition, in the present exemplary embodiment, the base station does not use the previously set initialization scramble code for activation time but randomly selects, at its activation time, the initialization scramble code from among previously determined scramble codes. Therefore, the initialization scramble code selectable range can be extended to the full range of all scramble codes, thereby significantly increasing the choices of the initialization scramble code. As a result, the probability of code collision at the time of simultaneous activation of a plurality of the base stations can be lowered.

Although the operation of the first exemplary embodiment is applied to the respective operations of the base station 11 and the mobile station 12 in the description of the present exemplary embodiment, the operation of the second exemplary embodiment may be applied to them. In this case, the processing from steps S2 to S11 of the base station 11 in FIG. 1 is changed to processing from steps S42 to S49 in FIG. 9, and processing from steps S23 to S30 of the mobile station 12 in FIG. 12 is changed to the processing from steps S53 to S62 in FIG. 10. According to this configuration, the mobile station 12 takes the initiative to autonomously select the service scramble code, in cooperation with the base station 11, not by duplicate determination but by only the interference measurement.

Further, although the description has been made with respect to the mobile communication system having two base stations 11 in the above respective exemplary embodiments, the assignment of the scramble code can be accomplished in the same manner in the mobile communication system having three or more base stations 11. Further, any type of a communication terminal (mobile communication terminal such as mobile phone and PDA (Personal Digital Assistant), on-vehicle terminal apparatus) may be used as the mobile station according to the above respective exemplary embodiments as long as it has the abovementioned functions. For example, an electronic apparatus such as a special measurement apparatus having a communication function may be used as the mobile station 12.

Further, the hardware and software configuration of each of the base station 11 and the mobile station 12 is not especially limited but each of the base station 11 and the mobile station 12 have any type of the hardware and software configuration as long as it can realize the abovementioned functions (means) of the respective components. For example, a configuration in which circuits are independently provided for each function, or configuration in which a plurality of functions are integrated in one circuit may be adopted. Alternatively, a configuration in which all functions are realized by software processing may be adopted.

Although the present invention has been described with reference to the exemplary embodiments, the present invention is not limited to the above exemplary embodiments and it is apparent to those skilled in the art that a variety of modifications and changes may be made without departing from the scope of the present invention. All such modifications and changes are included within the scope of the present invention.

INDUSTRIAL APPLICABILITY

The present invention can be applied to a mobile communication system, its scramble code assigning method, a mobile station, a base station, an operation method and program of the mobile station, and an operation method and program of the base station. In particular, the present invention is suitably applied to a method in which the base station autonomously sets a scramble code in a scramble code assigning method employed in a mobile radio communication cellular system.

The invention claimed is:

1. A scramble code assigning method of a mobile communication system that performs communication between a base station and a mobile station using a scramble code, the method comprising:
   a first communication step in which the base station determines an initialization scramble code from among a plurality of previously determined scramble codes and uses the determined initialization scramble code to perform communication;
   a notification step in which the mobile station determines, upon reception of a signal transmitted by the first communication step, whether a candidate scramble code selected from among code series other than the initialization scramble code is usable or not in communication, and notifies the base station of control information including the determination result; and
   a second communication step in which the base station determines a service scramble code from the candidate scramble codes based on the notified control information and uses the determined service scramble code to perform communication.

2. The scramble code assigning method according to claim 1, further comprising
   a step in which the base station selects the candidate scramble code from the plurality of scramble codes and notifies the mobile station of the selected candidate scramble code.

3. The scramble code assigning method according to claim 1, further comprising
   a step in which the mobile station selects the candidate scramble code from the plurality of scramble codes.

4. The scramble code assigning method according to claim 1, wherein
   the notification step includes a step in which the mobile station measures a correlation value between the signal transmitted from the base station and the candidate scramble code and determines, based on the measured correlation value, whether the candidate scramble code is usable or not in communication.

5. The scramble code assigning method according to claim 1, wherein
   the notification step includes a step in which the mobile station determines whether the candidate scramble code is usable or not in communication when receiving a predetermined control signal from the base station.

6. The scramble code assigning method according to claim 1, wherein
   the notification step includes:
   a step in which the mobile station performs cell search for identifying the scramble code of the base station based on a reception signal from the base station;
   a step in which the mobile station determines whether the scramble code identified by the sell search is the initialization scramble code or not; and
   a step in which the mobile station determines whether the candidate scramble code is usable or not in communication when determining that the scramble code identified by the cell search is the initialization scramble code.

7. The scramble code assigning method according to claim 1, wherein
the first communication step includes a step in which the base station selects the initialization scramble code from among one or more previously assigned initialization scramble codes in the plurality of previously set scramble codes.

8. The scramble code assigning method according to claim 1, wherein
the first communication step includes a step in which the base station selects the initialization scramble code from among the plurality of previously set scramble codes.

9. The scramble code assigning method according to claim 1, wherein
the notification step includes a step in which the mobile station notifies the base station of at least one of control information indicating that the candidate scramble code is determined to be usable in communication and control information indicating that the candidate scramble code is determined to be unusable.

10. The scramble code assigning method according to claim 1, wherein
the second communication step includes a step in which the base station determines the candidate scramble code as the service scramble code based on the total number of notifications of the control information transmitted from the mobile station and total number of notifications of control information indicating that the candidate scramble code is determined to be usable in communication or total number of notifications of control information indicating that the candidate scramble code is determined to be unusable in communication.

11. A mobile communication system that performs communication between a base station and a mobile station using a scramble code, wherein
the base station includes:
a first communicator which determines an initialization scramble code from among a plurality of previously determined scramble codes and uses the determined initialization scramble code to perform communication; and
a second communicator which determines a service scramble code from candidate scramble codes based the control information notified from the mobile station and uses the determined service scramble code to perform communication, and
the mobile station includes:
a determiner which determines whether a candidate scramble code selected from among code series other than the initialization scramble code is usable or not in communication upon reception of a signal transmitted by the first communicator of the base station; and
a notifier which notifies the base station of control information including the determination result of the determiner.

12. A mobile station that performs communication with a base station using a scramble code, comprising:
a determiner which determines, upon reception of a signal transmitted from the base station by communication using an initialization scramble code selected from among a plurality of previously determined scramble codes, whether a candidate scramble code selected from among code series other than the initialization scramble code is usable or not in communication; and
a notifier which notifies the base station of control information including the determination result of the determiner.

13. The mobile station according to claim 12, further comprising
a selector which selects the candidate scramble code from among the plurality of scramble codes.

14. The mobile station according to claim 12, wherein
the determiner includes a measuring unit which measures a correlation value between the signal transmitted from the base station and the candidate scramble code and determines, based on the measured correlation value, whether the candidate scramble code is usable or not in communication.

15. The mobile station according to claim 12, wherein
the determiner further determines whether the candidate scramble code is usable or not in communication upon reception of a predetermined control signal from the base station.

16. The mobile station according to claim 12, wherein
the notifier notifies the base station of at least one of control information indicating that the candidate scramble code is determined to be usable in communication and control information indicating that the candidate scramble code is determined to be unusable.

17. A base station that performs communication with a mobile station using a scramble code, comprising:
a first communicator which determines an initialization scramble code from among a plurality of previously determined scramble codes and uses the determined initialization scramble code to perform communication; and
a second communicator which determines a service scramble code from candidate scramble codes based on the control information including a determination result indicating whether a candidate scramble code selected from among code series other than the initialization scramble code is usable or not in communication, which is notified from the mobile station, and uses the determined service scramble code to perform communication.

18. The base station according to claim 17, further comprising
a selector which selects the candidate scramble code from the plurality of scramble codes and notifies the mobile station of the selected candidate scramble code.

19. The base station according to claim 17, wherein
the first communicator includes a selector which selects the initialization scramble code from among one or more previously assigned initialization scramble codes in the plurality of previously set scramble codes.

20. The base station according to claim 17, wherein
the first communicator includes a selector which selects the initialization scramble code from among the plurality of previously set scramble codes.

21. The base station according to claim 17, wherein
the second communicator includes a determiner which determines the candidate scramble code as the service scramble code based on the total number of notifications of the control information transmitted from the mobile station and total number of notifications of control information indicating that the candidate scramble code is determined to be usable in communication or total number of notifications of control information indicating that the candidate scramble code is determined to be unusable in communication.

22. An operation method of a mobile station that performs communication with a base station using a scramble code, the method comprising the steps of:

determining, upon reception of a signal transmitted from the base station by communication using an initialization scramble code selected from among a plurality of previously determined scramble codes, whether a candidate scramble code selected from among code series other than the initialization scramble code is usable or not in communication; and notifying the base station of control information including the determination result.

23. An operation method of a base station that performs communication with a mobile station using a scramble code, the method comprising the steps of:

determining an initialization scramble code from among a plurality of previously determined scramble codes;

using the determined initialization scramble code to perform communication;

determining a service scramble code from candidate scramble codes based on the control information including a determination result indicating whether a candidate scramble code selected from among code series other than the initialization scramble code is usable or not in communication, which is notified from the mobile station; and using the determined service scramble code to perform communication.

24. A non-transitory computer-readable medium storing an operation program of a mobile station that performs communication with a base station using a scramble code, the program allowing a computer to execute the steps of:

determining, upon reception of a signal transmitted from the base station by communication using an initialization scramble code selected from among a plurality of previously determined scramble codes, whether a candidate scramble code selected from among code series other than the initialization scramble code is usable or not in communication; and notifying the base station of control information including the determination result.

25. A non-transitory computer-readable medium storing an operation program of a base station that performs communication with a mobile station using a scramble code, the program allowing a computer to execute the steps of:

determining an initialization scramble code from among a plurality of previously determined scramble codes;

using the determined initialization scramble code to perform communication;

determining a service scramble code from the candidate scramble codes based on the control information including a determination result indicating whether a candidate scramble code selected from among code series other than the initialization scramble code is usable or not in communication, which is notified from the mobile station; and using the determined service scramble code to perform communication.

* * * * *